(12) United States Patent
Banduric

(10) Patent No.: US 9,337,752 B2
(45) Date of Patent: May 10, 2016

(54) INTERACTING COMPLEX ELECTRIC FIELDS AND STATIC ELECTRIC FIELDS TO EFFECT MOTION

(76) Inventor: Richard Banduric, Aurora, CO (US)

( * ) Notice: Subject to any disclaimer, the term of this patent is extended or adjusted under 35 U.S.C. 154(b) by 706 days.

(21) Appl. No.: 13/543,688

(22) Filed: Jul. 6, 2012

(65) Prior Publication Data

US 2014/0009098 A1    Jan. 9, 2014

(51) Int. Cl.
*H02N 1/00* (2006.01)
*H02N 11/00* (2006.01)

(52) U.S. Cl.
CPC ............. *H02N 11/00* (2013.01); *H02N 1/002* (2013.01); *H02N 1/008* (2013.01)

(58) Field of Classification Search
CPC .................................... H02J 4/00; H02N 1/00
USPC .................... 318/558; 310/308, 309
See application file for complete search history.

(56) References Cited

U.S. PATENT DOCUMENTS

| | | | |
|---|---|---|---|
| 1,974,483 A * | 9/1934 | Brown | H02N 1/002 310/308 |
| 2,949,550 A | 8/1960 | Brown | |
| 3,018,394 A | 1/1962 | Brown | |
| 3,022,430 A | 2/1962 | Brown | |
| 3,187,206 A | 6/1965 | Brown | |
| 3,196,296 A | 7/1965 | Brown | |
| 3,610,971 A | 10/1971 | Hooper | |
| 3,656,013 A | 4/1972 | Hooper | |
| 3,722,285 A * | 3/1973 | Weber | 73/382 R |
| 4,642,504 A * | 2/1987 | Jacobsen | 310/308 |
| 5,054,081 A * | 10/1991 | West | 381/191 |
| 5,845,220 A | 12/1998 | Puthoff | |
| 6,411,493 B2 | 6/2002 | Campbell | |
| 7,602,181 B1 | 10/2009 | Gerald, II et al. | |
| 2005/0197808 A1 | 9/2005 | Kuo | |

(Continued)

FOREIGN PATENT DOCUMENTS

| | | |
|---|---|---|
| EP | 0436405 A1 | 7/1991 |
| EP | 0486243 A2 | 5/1992 |
| GB | 300311 | 11/1928 |

OTHER PUBLICATIONS

K.J. Van Vlaenderen and A. Waser; Generalisation of Classical Electrodynamics to Admit a Scalar Fied and Longitudinal Waves; Hardonic Journal 24, 609-628 (2001).

(Continued)

*Primary Examiner* — Bentsu Ro
(74) *Attorney, Agent, or Firm* — Trenner Law Firm, LLC; Mark D. Trenner

(57) ABSTRACT

Systems and methods of interacting complex electric fields and static electric fields to effect motion are disclosed. An example method includes producing an action force having a reaction force perpendicular to the action force by interacting a relative velocity electric field based on charge of a moving first charged object and a static charge on a second charged object in a different inertial frame of reference. Another example method includes producing an action force having a reaction force perpendicular to the action force by interacting an acceleration generated electric field based on acceleration of a first charged object and a static charge on a second charged object in a different inertial frame of reference. Another example method includes producing an action force having a reaction force perpendicular to the action force by interacting a scalar electric potential and static electric field.

15 Claims, 24 Drawing Sheets

(56) References Cited

U.S. PATENT DOCUMENTS

2007/0034514 A1     2/2007    Riera
2007/0213954 A1     9/2007    Price

OTHER PUBLICATIONS

A.K.T. Assis and Marcelo Bueno; Longitudinal Forces in Weber's Electrodynamics; international Journal of Modern Physics B, vol. 9, No. 28 (1995) 3689-3969.

Lars Johansson; Longitudinal Electrodynamic Forces and their Possible Technological Applications; Master of Science Thesis; Lund Institute of Technology, Sweden (1996).

Bander, Thomas B. et al., "Force on an Asymmetric Capacitor", Army Research Laboratory, Adelphi, MD, Mar. 2003, 34 pp.

Canning, Francis X., et al., "Asymmetrical Capacitors for Propulsion", Institute for Scientific Research, Inc., Fairmount, West Virginia, Oct. 2004, 23 pp.

Moon, Parry, et al., "The Coulomb Force and the Ampere Force", Apr. 1954, 11 pp.

Hooper, William J., "New Horizons in Electric, Magnetic & Gravitational Field Theory", http://www.rexresearch.com/hooper/horizon.htm; 52 pp.

Hartman, James E., "A Review of William J. Hooper and his All-Electric Motional Electric Field Generator", http://www.rexresearch.com/hooper/hooper1.htm; Feb. 2, 1996; 4 pp.

Drury, David M., "The Unification of the Lorentz and Coulomb Gauges of Electromagnetic Theory", IEEE Transactions on Education, vol. 43, No. 1, Feb. 2000, 4 pp.

Klicker, Kyle A., "Motional Electric Fields Associated with Relative Moving Charge", 1986, 67 pp.

Biefeld-Brown effect located at http://en.wikipedia.org/wiki/Biefeld%E2%80%93Brown_effect, 5 pp.

Written Opinion of the International Searching Authority in PCT/US2013/048410 issued Jan. 6, 2015, 5 pages.

International Search Report and Written Opinion dated Sep. 25, 2013 in PCT/US2013/048410, 9 pages.

\* cited by examiner

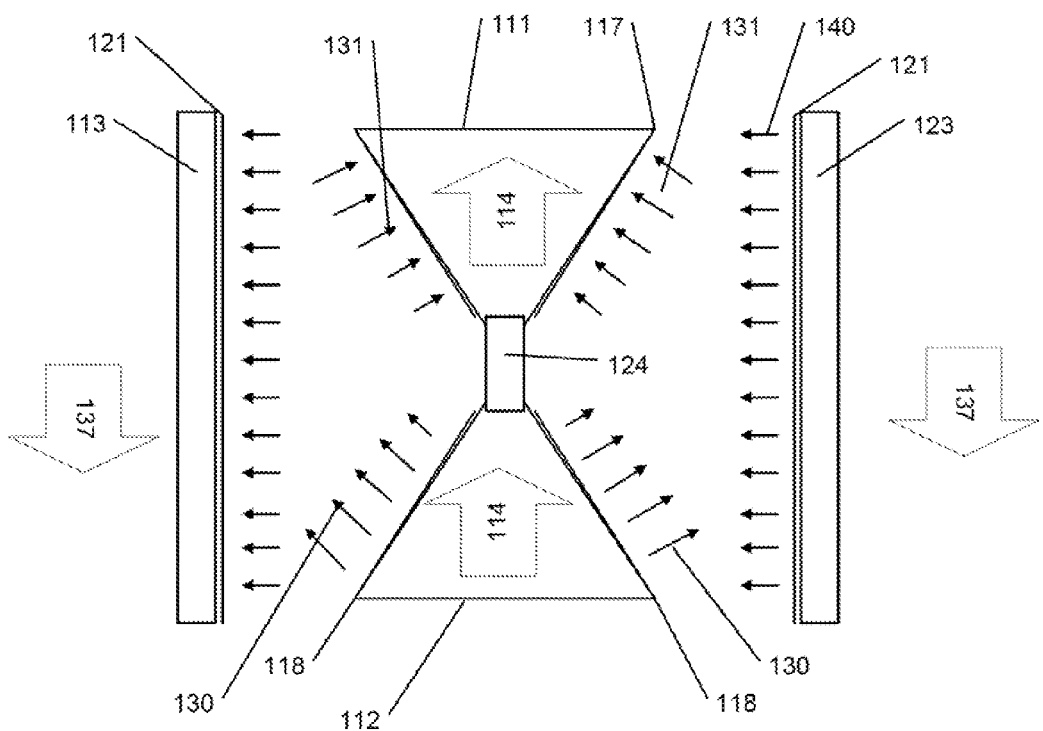
*Fig.* 15
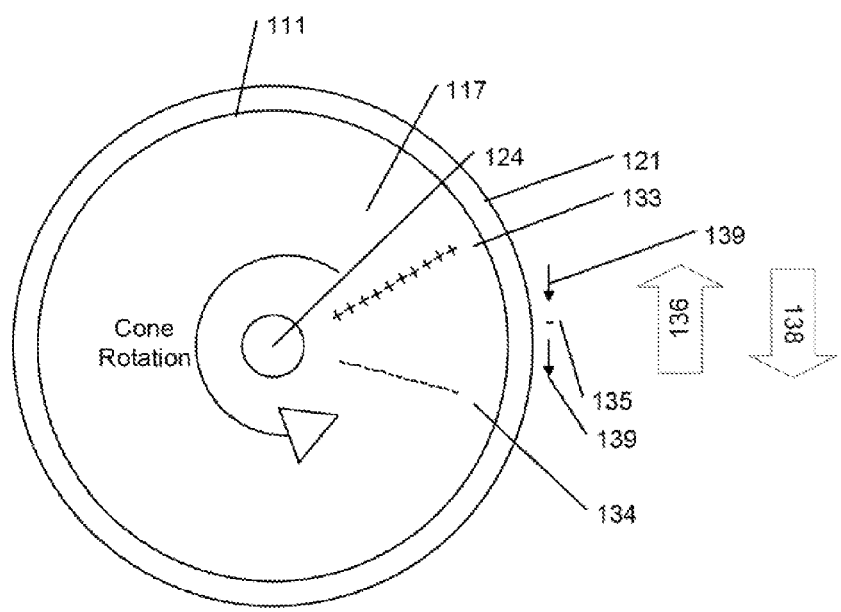

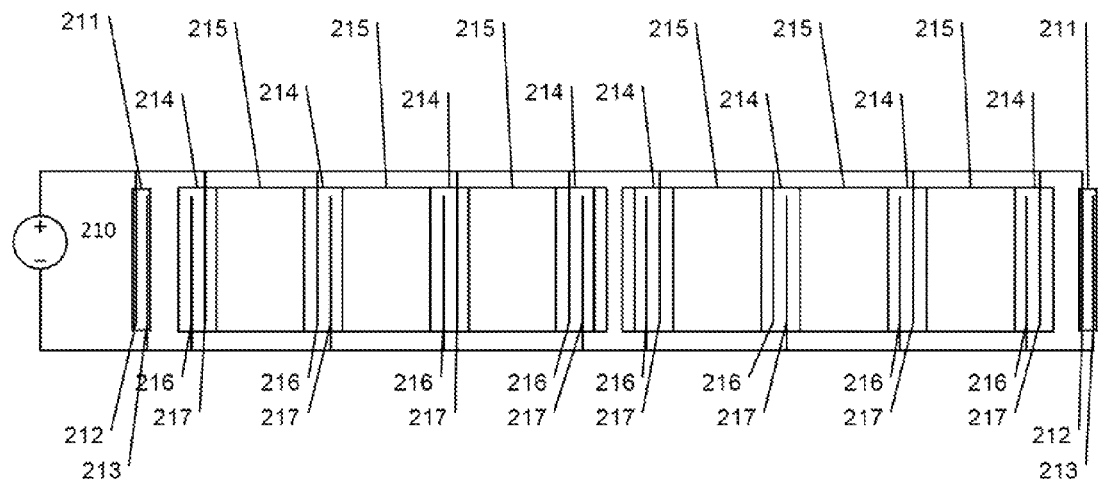
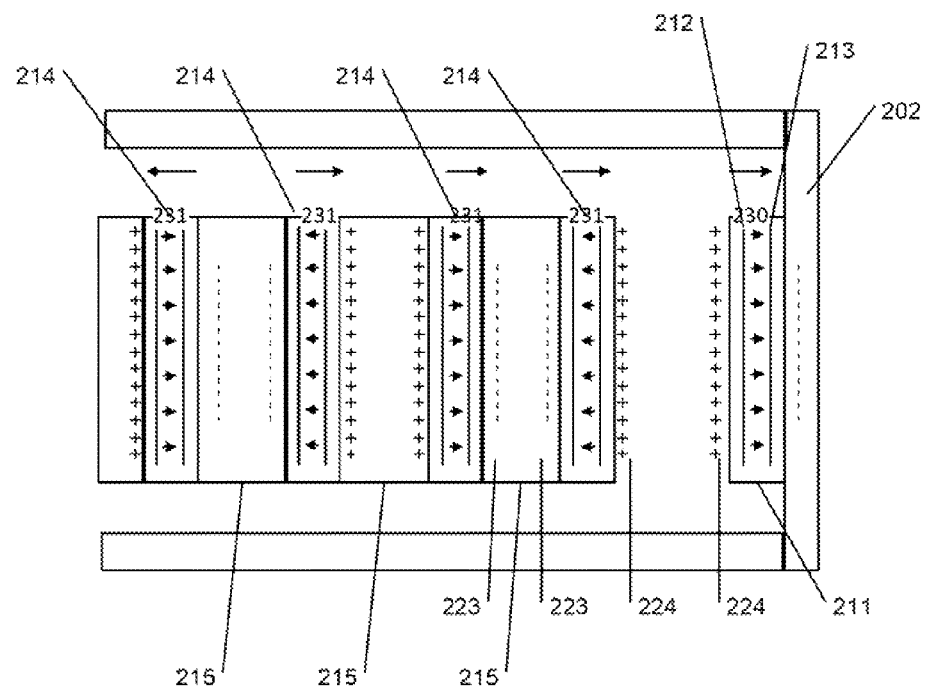
Fig. 17

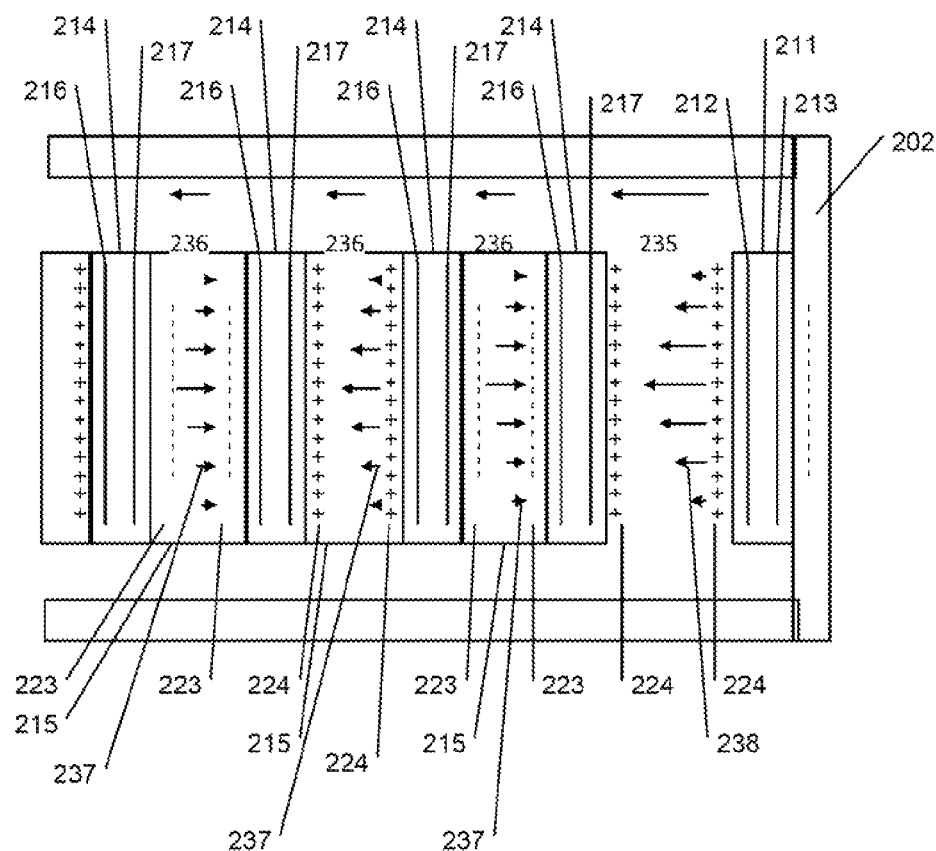
Fig. 18
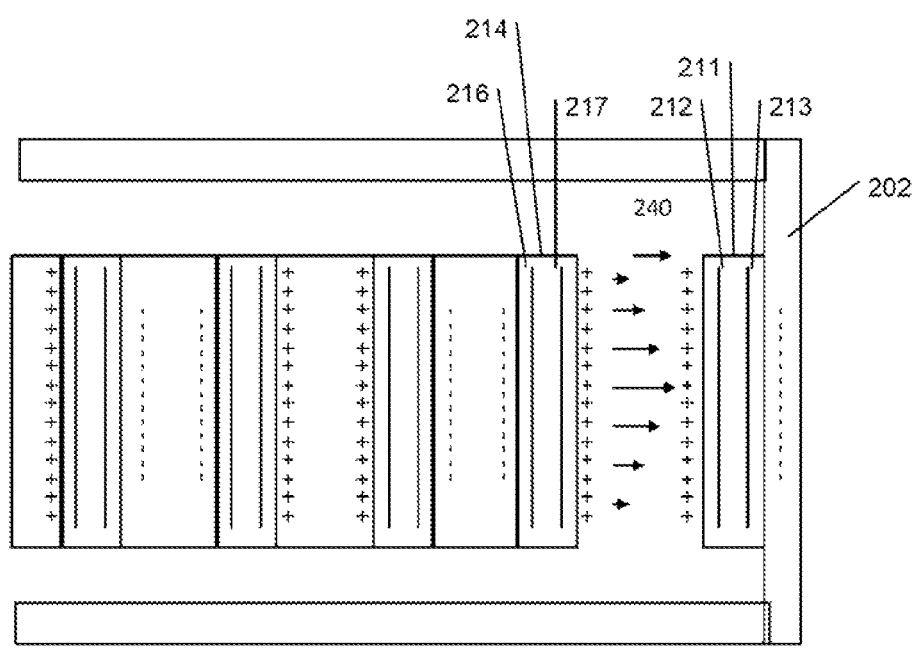

INTERACTING COMPLEX ELECTRIC FIELDS AND STATIC ELECTRIC FIELDS TO EFFECT MOTION

BACKGROUND

The mathematical framework used in physics and electrical engineering today to describe electromagnetic fields is based on work by Gauss, Faraday, and Ampere. The work is embodied in the following differential equations based on vector calculus, which today are referred to as Maxwell's equations:

$$\nabla \cdot D = \rho \text{ Gauss's law for electricity}$$

$$\nabla \cdot B = 0 \text{ Gauss' law for magnetism}$$

$$\nabla \times E = -\frac{\partial B}{\partial t} \text{ Faraday's law of induction}$$

$$\nabla \times H = J + \frac{\partial D}{\partial t} \text{ Ampere's law}$$

These equations were derived from experiments in the late 1800's with current-carrying conductors and are optimized to describe the electromagnetic effects from current-carrying conductors. These equations were derived under the assumption that only electromagnetic fields (E and B) are physical, and that the electromagnetic potentials φ (Electric Potential) and A (Magnetic Vector Potential), are purely mathematical constructs. These equations were thought to be complete at the time to describe all electromagnetic effects that could be observed from electrical conduction and convection currents.

By the 1980's the Aharonov-Bohm effect had proven the physicality (the reality) of the electromagnetic potentials, φ (Electric Potential) and A (Magnetic Vector Potential). The above equations by including only the fields and not their associated potentials end up not completely describing all the effects that are being observed from electrical convection currents.

BRIEF DESCRIPTION OF THE DRAWINGS

FIG. 15 illustrates a relative velocity electric field on the stationary cylinder in FIG. 13.

FIG. 17 illustrates electrical connections and static electric fields from the embedded capacitors in FIG. 16.

FIG. 18 illustrates relative velocity electric fields on charges on the embedded capacitors in the rotating disk in FIG. 16.

DETAILED DESCRIPTION

Figure 1A:
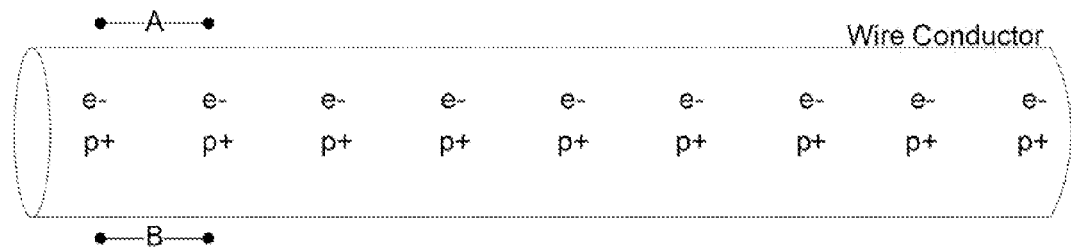
FIG. 1a-f illustrate electro-magnetic fields.
Figure 1B:
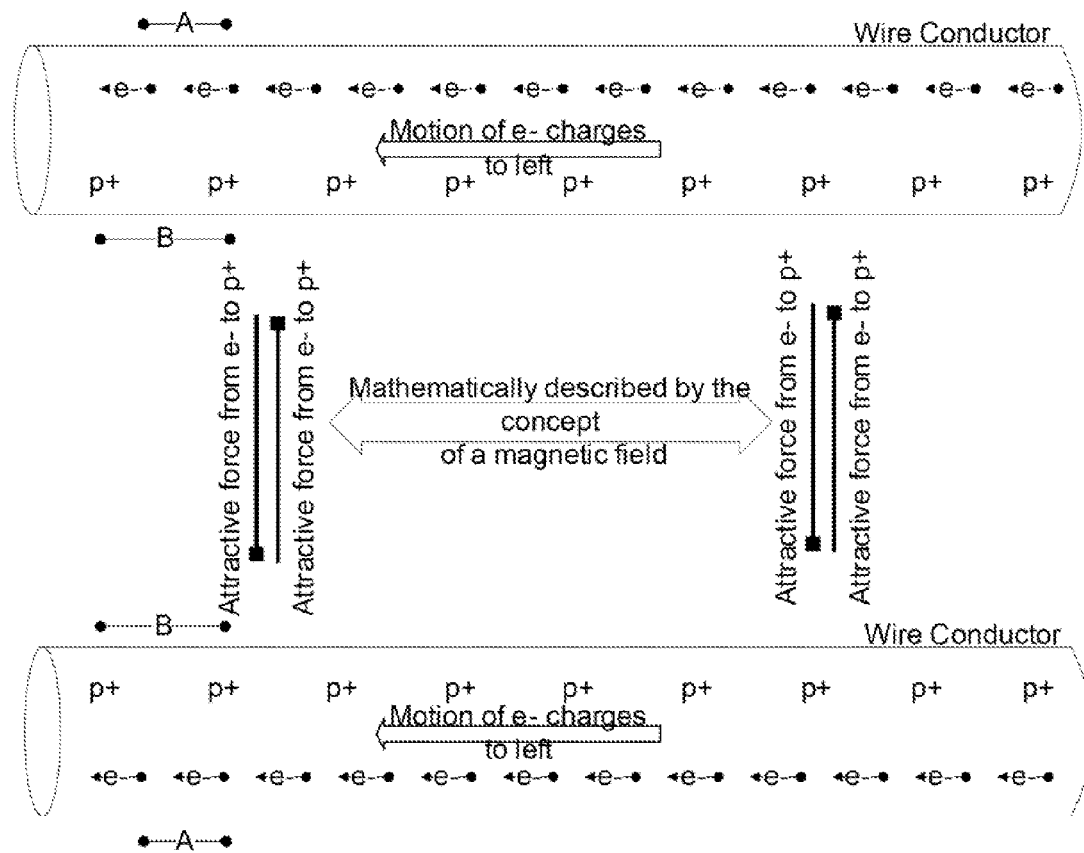

FIG. 1a-f illustrate electro-magnetic fields. Magnetic forces generated from current-carrying conductors are due to the effect of Lorentz contraction of moving negative charge carriers relative to the positive stationary ions. In a current-carrying conductor, the conductor appears to be electrically neutral in one inertial system, but electrically charged in another inertial system, as illustrated on by FIG. 1a-b. In FIG. 1a, a wire conductor is shown without a conduction current. A is the distance between the negative charges from a stationary frame of reference. B is the distance between the positive charges from a stationary point of view. In FIG. 1a, A=B. In FIG. 1b, a conduction current is shown in a wire conductor from the positive charges frame of reference or the stationary frame of reference. A is the Lorentz contracted distance between the negative charges from a stationary frame of reference, and B is the distance between positive charges from a stationary frame of reference. In FIG. 1b, A<B. This effect generates magnetic forces between two current-carrying wires, attractive when electrical currents are in the same direction, and repulsive when electrical currents are in opposite directions.

Figure 1C:
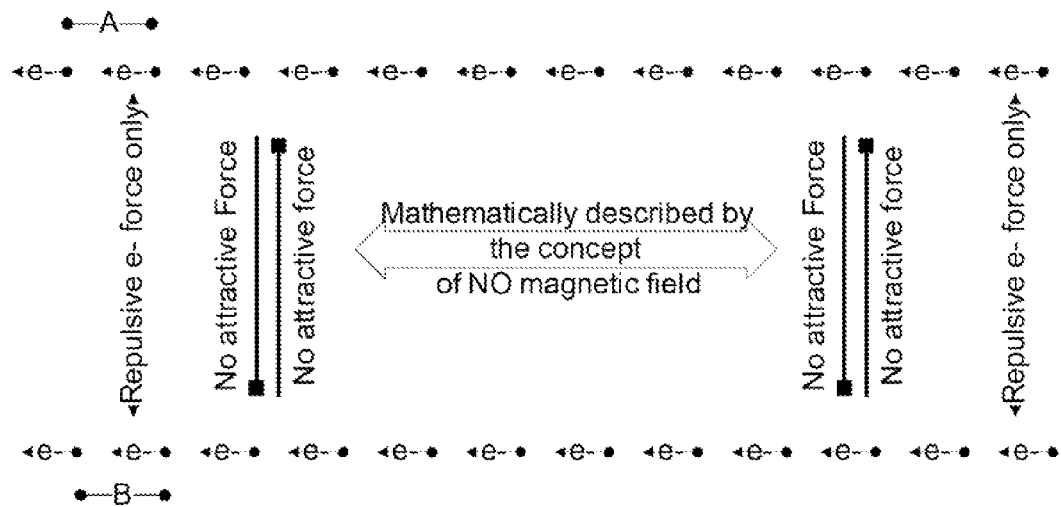
Figure 1D:
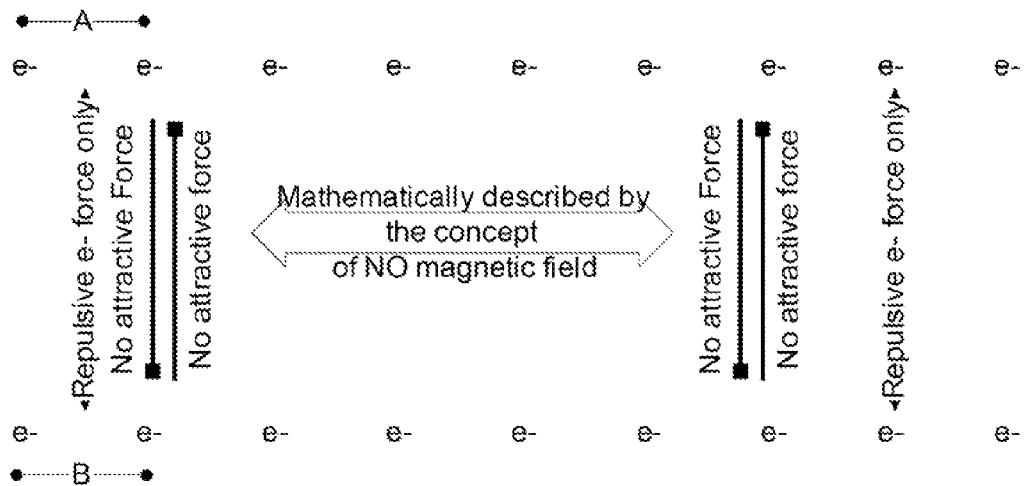

An electric convection current is an electric current composed of moving electrical charges that have the same inertial frames of reference. If all of the moving electric charges in an electrical current have the same inertial frame, then there is no magnetic force generated by the electric convection current. Examples of convection currents that do not generate magnetic fields are electron beams or proton beams, as illustrated in FIG. 1c-d. FIG. 1c-d show two electron beams in a vacuum. In FIG. 1c, A is the distance between the negative charges of beam 1 from a stationary frame of reference, and B is the distance between the negative charges of beam 2 from a stationary frame of reference. In FIG. 1c, A=B. In FIG. 1d, A is the distance between the negative charges of beam 1 from a moving electron frame of reference, and B is the distance between the negative charges of beam 2 from the moving electrons frame of reference. In FIG. 1d, A=B.

Figure 1E:
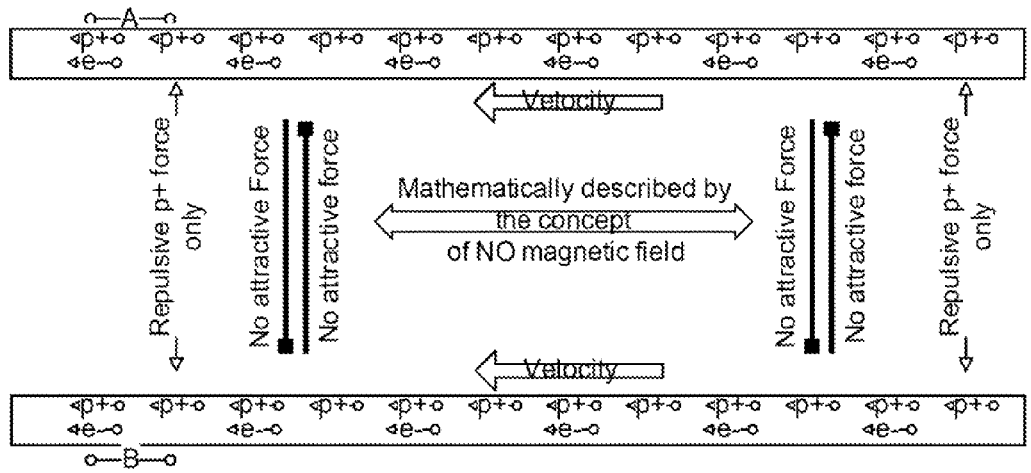
Figure 1F:
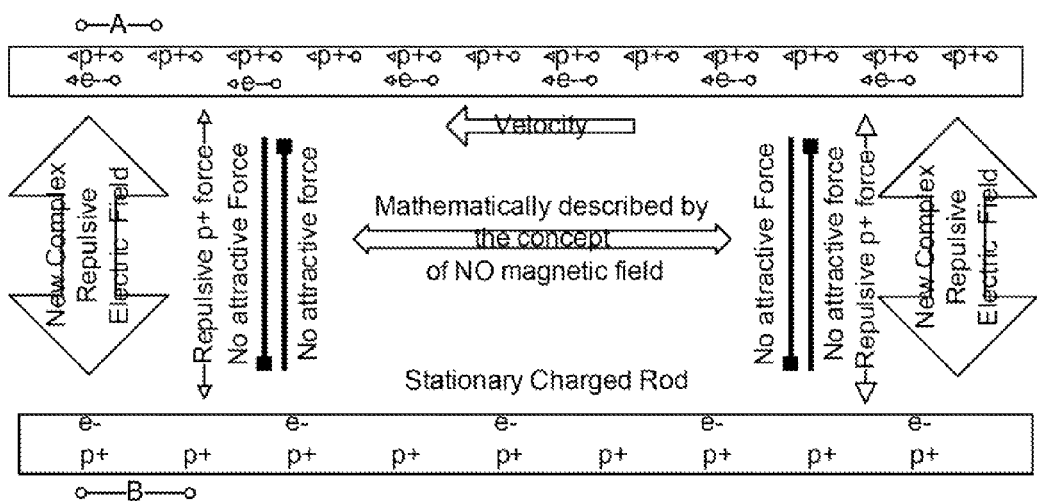

Another type of convection current that doesn't have a magnetic field is a moving charged object. If two like charged objects are moving together with the same velocity and direction, the two charge objects do not have any attractive forces between one another as two conduction currents flowing through two conductors do. Instead, there is a repulsive force between the like charged objects caused by electrostatic potentials. If the like charged objects are moving in opposite directions, still no magnetic force is generated by the objects that may be described by a magnetic field. Instead, there is a greater repulsive force between the like charged objects caused by static electric fields, and an added complex electric field from the velocities relative to one another, as illustrated by FIG. 1e-f. FIG. 1e-f show convection currents of two moving charged objects, such as two positively charged square rods. In FIG. 1e, A is the distance between the positive charges from a stationary frame of reference of the first moving rod, and B is the distance between the positive charges in the second moving rod from a stationary frame of reference. In FIG. 1e, A=B. In FIG. 1f, A is the distance between the charges from the stationary frame of reference for the moving rod, and B is the distance between the stationary charges for the stationary rod from a stationary frame of reference. In FIG. 1f, A<B. This difference is observed as a complex electric field that is referred to herein as a relative velocity electric field.

Maxwell's equations that describe electromagnetic fields are based on vector calculus and have terms for a magnetic field. These equations have terms to describe a magnetic field and thus are not valid to describe the complex electric fields from electrical convection currents.

The original mathematical framework promoted by James Clerk Maxwell, Peter Tait, and Sir William Hamilton for electrodynamics was based on the bi-quaternion mathematical framework, or in its modern form known as a geometric algebra or as the even sub algebra of Clifford Algebra of Rank 0, 3. Maxwell's equations were originally derived by Oliver Heaviside from Maxwell's original bi-quaternion mathematical framework for electrodynamics. The following derivation is the modern derivation of the electric field and magnetic field equations from Maxwell's original bi-quaternion electromagnetic potential. The units used for the modern derivation is the same units of the magnetic vector potential of Weber/meter.

Definitions of Symbols and Operators $$\text{Quaternion:} X = x_0 + ix_1 + jx_2 + k \times_3 \text{ or } X = x_0 + \vec{i} \cdot \vec{x}$$

$$\text{Bi-Quaternion:} X = x_0 + iy_0 + \vec{i} \cdot (\vec{x} + i\vec{y})$$

Nabla:

$$\nabla = \left( \frac{i}{c} \frac{\partial}{\partial t} + \vec{i} \cdot \vec{\nabla} \right)$$

$$\vec{\nabla} = \left( \frac{\partial}{\partial x_1}, \frac{\partial}{\partial x_2}, \frac{\partial}{\partial x_3} \right)$$

$\Phi$=Electric Potential (Units=Volts)
A=Magnetic Vector Potential (Units=Weber/meter)
c=Speed of Light (Units=meters/second)

$$\frac{\Phi}{c} = A \text{ Weber/meter}$$

The Quaternion Electromagnetic Potential $$A = \frac{i}{c} \Phi + \vec{i} \cdot \vec{A} \text{ Weber/meter}$$

Note: $x_0 = 0$, $i\vec{y} = 0$ $$\nabla A = \left( \frac{i}{c} \frac{\partial}{\partial t} + \vec{i} \cdot \vec{\nabla} \right)\left( \frac{i}{c} \Phi + \vec{i} \cdot \vec{A} \right) \text{Tesla}$$

$$\nabla A = \left( \frac{1}{c^2} \frac{\partial \Phi}{\partial t} + \vec{\nabla} \cdot \vec{A} \right) + \vec{i} \cdot \left[ \vec{\nabla} \times \vec{A} + \frac{i}{c}\left( \frac{\partial \vec{A}}{\partial t} + \vec{\nabla} \Phi \right) \right] \text{Tesla}$$

Resulting Equations $$\vec{E} = -\frac{\partial \vec{A}}{\partial t} - \vec{\nabla} \Phi \text{ Volt/meter}$$

Note: $\frac{i}{c}(\vec{E})$Tesla $$\vec{B} = \vec{\nabla} \times \vec{A} \text{ Tesla}$$

$$S = \frac{1}{c^2} \frac{\partial \Phi}{\partial t} + \vec{\nabla} \cdot \vec{A} \text{ Tesla}$$

The resulting equations are reformulated to derive the vector calculus based Maxwell's Equations. The first and second equations shown above describe the electric and magnetic fields from current carrying conductors. The third equation shown above is referred to as the magnetic scalar equation. The effects of the third equation are not observed for conduction currents, and thus have their terms rationalized to be equal to zero to derive the Coulomb and Lorentz gauges. The reason that the magnetic scalar is not observed for conduction currents are first due to the low speeds of drift electrons in conductors used today (usually about 1 cm/second). In addition, the units are incorrect for the magnetic scalar and such isn't measurable with a magnetic field meter.

To arrive at the correct mathematical framework for convection currents these equations are re-derived from Maxwell's original bi-quaternion electromagnetic potential to eliminate the terms for a magnetic field. As such, Maxwell's original bi-quaternion electromagnetic potential is converted to the electrodynamic potential having units of Volts instead of Weber/meter. To change the units, the following derivation is used, multiplying the magnetic vector potential by c (speed of light) to convert to Volts.

Quaternion Electromagnetic Potential $$A = \frac{i}{c} \Phi + \vec{i} \cdot \vec{A} \text{ Weber/meter}$$

$$cA = \frac{ci}{c} \Phi + \vec{i} \cdot c\vec{A} \text{ Volts}$$

$$cA = \Phi \text{ Volts}$$

$$\Phi = i\Phi + \vec{i} \cdot c\vec{A} \text{ Volts}$$

The following conversion may be used to change all the terms into the same form.

Definitions of Symbols and Operators $\vec{V}$=Velocity Vector (Units=meter/second)
Q=Charge (Units=Coulombs)
r=Distance to Charge (Units=meters)

Conversion of $c\vec{V}$ to $\Phi$ $$\vec{A} = \frac{\mu_o Q \vec{V}}{4\pi r} \text{ Weber/meter}$$

$$c = \frac{1}{\sqrt{\mu_o \varepsilon_o}} \text{ meter/second}$$

Note: $\mu_o = \frac{1}{\varepsilon_o c^2}$ $$c\vec{A} = \frac{c\mu_o Q \vec{V}}{4\pi r} \frac{\text{Weber}*\text{meter}}{\text{second}*\text{meter}} \text{ or Volts}$$

$$c\vec{A} = \frac{cQ\vec{V}}{\varepsilon_o c^2 4\pi r} \text{ Volts}$$

$$c\vec{A} = \frac{\vec{V}}{c} \frac{Q}{4\pi \varepsilon_o r} \text{ Volts}$$

$$\Phi = \frac{Q}{4\pi \varepsilon_o r} \text{ Volts}$$

$$c\vec{A} = \frac{\vec{V}}{c} \Phi \text{ Volts}$$

Electric field equations may be derived using the following definitions:

Definitions of Symbols and Operators

Nabla:

$$\nabla = \left(\frac{i}{c} \frac{\partial}{\partial t} + \vec{\imath} \cdot \vec{\nabla}\right)$$

$$\vec{\nabla} = \left(\frac{\partial}{\partial x_1}, \frac{\partial}{\partial x_2}, \frac{\partial}{\partial x_3}\right)$$

Quaternion Electrodynamic Potential for a Moving Charged Object $$\Phi = i\Phi + \vec{\imath} \cdot \frac{\vec{V}}{c} \Phi \text{ Volts}$$

$$\nabla \Phi = \left(\frac{i}{c} \frac{\partial}{\partial t} + \vec{\imath} \cdot \vec{\nabla}\right)\left(i\Phi + \vec{\imath} \cdot \frac{\vec{V}}{c} \Phi\right) \text{ Volts/meter}$$

$$\nabla \Phi = \left(\frac{\partial}{\partial t} \frac{\Phi}{c} + \vec{\nabla} \cdot \frac{\vec{V}}{c} \Phi\right) + \vec{\imath} \cdot \left[\vec{\nabla} \times \frac{\vec{V}}{c} \Phi + i\left(\frac{\partial \vec{V}}{\partial t} \frac{\Phi}{c^2} + \vec{\nabla} \Phi\right)\right] \text{ Volts/meter}$$

The resulting Field equations are:

Electric Field Equation $$\vec{E} = -\frac{\partial \vec{V}}{\partial t} \frac{\Phi_2}{c^2} - \vec{\nabla} \times \frac{\vec{V}}{c} \Phi_1 - \vec{\nabla} \Phi_0 \text{ Volt/meter}$$

Scalar Electric Potential Equation $$S = \frac{\partial}{\partial t} \frac{\Phi_0}{c} + \vec{\nabla} \times \frac{\vec{V}}{c} \Phi_3 \text{ Volts/second}$$

Potential to Charge relation $$\Phi_0 = \frac{\text{Charge}}{\text{Static Capacitance}} \text{Volts}$$

$$\Phi_1 = \frac{\text{Charge}}{\text{Dynamic Capacitance}} \text{Volts}$$

$$\Phi_2 = \frac{\text{Charge}}{\text{Acceleration Capacitance}} \text{Volts}$$

$$\Phi_3 = \frac{\text{Charge}}{\text{Dynamic Capacitance}} \text{Volts}$$

Dynamic Capacitance=Static Capacitance/Relative Velocity Geometric Gain

Acceleration Capacitance=Static Capacitance/Acceleration Geometric Gain

The "Potential to charge relationship" for the different potentials has been experimentally determined to be different for the different terms in this equation. The reason for these differences is that the relative velocity electric fields or acceleration generated electric fields do not experience capacitance the same way that a static charge does. The relative velocity electric fields or acceleration generated electric fields experiences a different capacitance that is much smaller than the static capacitance, depending on the interactions of the relative velocity electric fields with the static charges due to the geometry of the charged objects. This decrease in the apparent capacitance is referred to herein as "gain," because it causes the potential term in the first and second terms of the electric field equation above to be much greater than the static potential in the third term. This increase in the potential also applies to the second term of the scalar electric potential equation. This is particularly apparent in the smooth flat conductive surface on the rotating ring for the example discussed below with reference to FIG. 4. In this example, an 11 inch conductive ring was charged to a potential of a +1000 volts. The ring was rotating at 3600 rpm, which gives a velocity at the edge of the ring of 50 meters/second. Without any "gain" the second term in the electric field equation above "(Velocity/c)*Potential" gives the following results for this rotating disk: 50/300000000*1000=0.00017 volts.

When an electric field meter is used to measure the electric field from the rotating ring, an increase is observed of +10 Volts (to +1010 Volts) in the electric field above the face of the ring near the edge when it is rotating, compared to when it is not rotating. This difference in the two values is referred to using the terminology herein as a geometric gain of 59,000. The difference between the two results is due to the smaller dynamic capacitance observed in the second term in the electric field equation, along with the amplification of the electric field above the ring due to the non-perpendicular components of the relative velocity electric field amplifying the electric field near the edge of the disk.

Again with reference to the above equations, the first electric field equation now has three terms that correctly represent the electric field for electrical convection currents. The new term of the cross product of the velocity and electrical potential is representative of the increase of the electric field that is perpendicular to the relative motion of a charged object. This increase in the electric field is the consequence of Lorentz contraction of the moving charged object.

The second scalar electric potential equation is a new potential observed as the dot product of the velocity and electric potential. This new potential is a scalar and is also due to the Lorentz contraction of a charged object. This new potential is observed as an increase or decrease in the electric potential in the direction of motion that adds or subtracts to the apparent electric potential of an object when viewed from a different inertial frame of reference. This is observed as an increase of the electric field as a charged object moves toward a stationary point and a decrease in the electric field as a charged object moves away from a stationary point.

The scalar electric potential described by the second equation has two characteristics that the static electric potential does not. The scalar electric potential is coupled to a point in space, whereas the static electric potential is coupled to a charge. This scalar electric potential is coupled to a point in space that does not need to have the same position as the charge creating the potential. This allows the scalar electric potential to be decoupled from the originating charge, whereas the static electric potential is an electric potential coupled to the originating charge. In addition, the scalar electric potential has a time component that implies that this potential may be built up over time.

An action force may be generated with a reaction force perpendicular to the action force based on an interaction of complex electric fields generated from electrical convection currents. Production of an action force uses the interaction of complex electric fields that produces a reaction force perpendicular to the direction of the action force. The complex electric fields are static electric fields from the motion of charged objects (electrical convection currents) from the perspective of another moving charged object in a different inertial frame of reference. These complex electric fields are a direct result of the Lorentz contraction from the relative velocity of a moving static charge from the perspective of a different inertial frame of reference. This creates a situation where a moving charged object has a total electric field that is composed of a static electric field component and a complex electric field component from its relative motion.

This complex electric field is composed of 4 elements that modify the total electric field differently depending on the perspective that the moving charged object has to the observer. The first component is the increase in the electric field that is observed perpendicular to the direction of motion of a charged object from the cross product of the charge on the object and the relative velocity of the moving charged object. The second component is the added effect from the electric field from the electric scalar potential that is observed in the direction of motion of the moving charged object. The third component is the electric field created from the acceleration of the charged object. This electric field component is observed in the direction of the acceleration that is observed in all inertial frames of reference. The fourth component is the decoupled electric field from that arises from the electric scalar potential that builds up from the perpendicular acceleration of a moving charged object that is observed in a different inertial frame of reference from the moving charged object. These four different electric field components plus the static electric field create a total electric field from a moving charged object that is different in different inertial frames of references and different when observed from different perspectives of the moving charged object. This results in the effect where two moving charged objects with different shapes in different inertial frames of references with different perspectives of each other experiencing different electrical forces on each other from the interactions of their total electric fields.

Based at least in part on the above, assemblies or devices and methods are disclosed herein for the production of an action force by using the interaction of complex electric fields that produces a reaction force that is perpendicular to the direction of the action force.

An example of a complex electric field interaction is the relative velocity electric fields from the cross product of the velocity, and the electric charge from a moving charged object and the static electric field of another charged object in a different inertial frame of reference. An example assembly or device disclosed herein has rotating and stationary charged disks with different types of conducting films to generate different relative velocity electric fields while in motion. The charged disks may be arranged to exploit the difference in the relative velocity electric fields from these conductive films to produce an axial action force along the axis rotation of the disks that has a reaction force that is observed as a rotational force that resists the rotation of the rotating disk.

Another example of a complex electric field interaction is the acceleration generated electric fields of an accelerating charged element and the static electric field of another charged element. An example assembly or device disclosed herein has one angled rotating disk and two angled stationary disks arranged to exploit forces created by the difference in the angular acceleration generated electric fields and the static electric fields. This results in an extra radial force on the rotating disk that counteracts the centripetal force of the rotating disk along with an axial force along the axis rotation of the disks.

Another example of a complex electric field interaction is the relative velocity electric fields from the potential produced from the dot product of the velocity and the electric charge from a moving charged object, and the static electric field of another charged object in a different inertial frame of reference. An example assembly device disclosed herein has one charged cylindrical tube and two charged rotating cones to generate a convection current that would generate a longitudinal force on the inner cones and a rotational force that resists the rotation of the inner cones.

In another example, an assembly or device disclosed here in has embedded capacitors in a rotating disk to counteract the centrifugal forces that the rotating disk experiences. This embodiment exploits the difference in the relative velocity electric field due to the cross product of the charge velocities for the different charged capacitor elements to generate forces that counteract the centrifugal forces. The reaction force to this force is a rotational force that resists the rotation of the rotating disk.

In another example, an assembly or device disclosed here in has one rotating dual conical disk and two stationary disks to exploit the difference in the relative velocity electric fields from the cross product of the velocity and potential of a flat surface and the relative velocity electric fields from the relative velocity electric potential of the dot product of the velocity and potential of a curved surface. This results in an axial force whose reaction force is a rotational force that resists the rotation of the rotating disk. This device also exploits the relative velocity electric fields from the cross product of the velocity from the rotating disk on the outside section of the rotating disk to generate a force that counteracts the centripetal force experience by the rotating disk.

These are only examples intended to illustrate assemblies or devices which may be implemented. Other example assemblies or devices may also be developed by those having ordinary skill in the art after becoming familiar with the teaching here. As such, these example assemblies or devices are not intended to be limiting in any way.

The production of complex electric fields from the relative motions of charged objects in different inertial frames of reference depends at least in part on the charged objects being electrically isolated from each other in all inertial frames of reference. This is easiest to implement by using moving charged insulators as the charged objects. But it is difficult to charge the objects in a controlled manner. Instead conductors may be used to apply the charge on or in a moving object. The use of conductors is also difficult, due to the electric field inside the conductor having to be at or near zero that causes redistributing of the mobile negative charge carriers in a conductor.

This adds a number of restrictions on using conductors to hold the charge on moving charged objects. The first restriction is that the conductors do not connect or even cross different inertial frames of references of the charged objects being used to create the complex fields. This includes minimizing the length of a portion of the conductor outside of the inertial frame of reference of a moving charged object connected to it. This precludes using a non-isolated potential source to charge the moving objects unless the source is in the same inertial frame of reference as the moving object.

For a potential source to be isolated, the outputs of the potential source have their internal output conductive elements that charge a moving object isolated from other different inertial frames of reference. This favors use of electrostatic induction to charge the moving charged elements from a different inertial frame of reference due to the input and outputs are not electrically connected to one another. These restrictions also apply to using electronic components that rely on internal electric fields to function like semiconductors. These restrictions do not apply to electronic components that have isolated input and output conductors such as, e.g., electronic tubes, switches, or relays.

Relative velocity electric fields do not have the condition that the electric field be at or near zero inside the conductor in the conductor's inertial frame of reference, because in the conductor's frame of reference the relative velocity field is not observed by the conductor. If a conductor does cross an inertial frame of reference then the relative velocity field is observed by the different conductor segments, and the mobile negative electric carriers try to redistribute and short out the relative velocity electric fields. The amount of redistribution is dependent on the perspective of the conductor has to the different segments of the conductor that is in the different inertial frames of reference.

Redistribution is also dependent at least in part, on the ratio of the amount of the conductor in one inertial frame of reference, and the amount in the other inertial frame of reference. This is the main reason that relative velocity electric fields may not be observed in moving charged elements having conductors (e.g., electric motor rotors). Charged rotating elements used in modern machines are connected directly or indirectly to a large round conductive sphere that is about 8000 miles in diameter (called "ground") that effectively extinguishes any relative velocity electric field that might appear on conductors.

This effect can be mitigated by using the gradient of the relative velocity electric field observed by the conductor segments in the other inertial frames of reference to block the negative carriers from shorting out the relative velocity electric field in a different segment. This effect can also be mitigated by the perspective that the different segments see from each other. An example of how perspective and gradients are important in the production of relative velocity electric fields is a negatively charged rotating ring. If the ring is charged with a non-isolated potential source thru the axis of rotation from the center of the ring by a conductor connected to the inside of the ring the relative velocity electric field is usually extinguished. If the same ring is charged from the same source through the axis of rotation from the center of the ring with a connection to the ring on the outside of the ring, a relative velocity electric field is observed.

The electric scalar potential is created at a point in space from the motion of a charged object that creates its own electric field. The energy of the scalar electric potential is contained in its electric field. If the electric field from the electric scalar potential encounters a conductor that has an electric field gradient to an opposite scalar potential the conductor will drain the energy from both of the electric scalar potentials. To buildup an electric scalar potential, care is exercised to not drain or short out the electric field from the electric scalar potential with a conductor.

Relative velocity electric fields do not sense the relative velocity fields from other charges in the same inertial frame of reference. This is the opposite effect that is observed from static electric fields which sense other static electric fields. An example is the static electric field observed from the capacitor plates of a charged capacitor. The static electric field is usually not observed outside the dielectric in between the plates. Whereas the relative velocity electric field from a moving charged capacitor is observed on the outside of the capacitor plates when viewed from different inertial frames of reference, and is not observed in the dielectric in between the plates where the relative velocity fields offset each other. This needs calculating the relative velocity field gradients and the static electric field gradients independently and then combining the results using the conductor geometry as a guide to determine the total electric field of a moving charged object if it contains conductors.

Before continuing, it is noted that as used herein, the terms "includes" and "including" mean, but is not limited to, "includes" or "including" and "includes at least" or "including at least."

Figure 2:
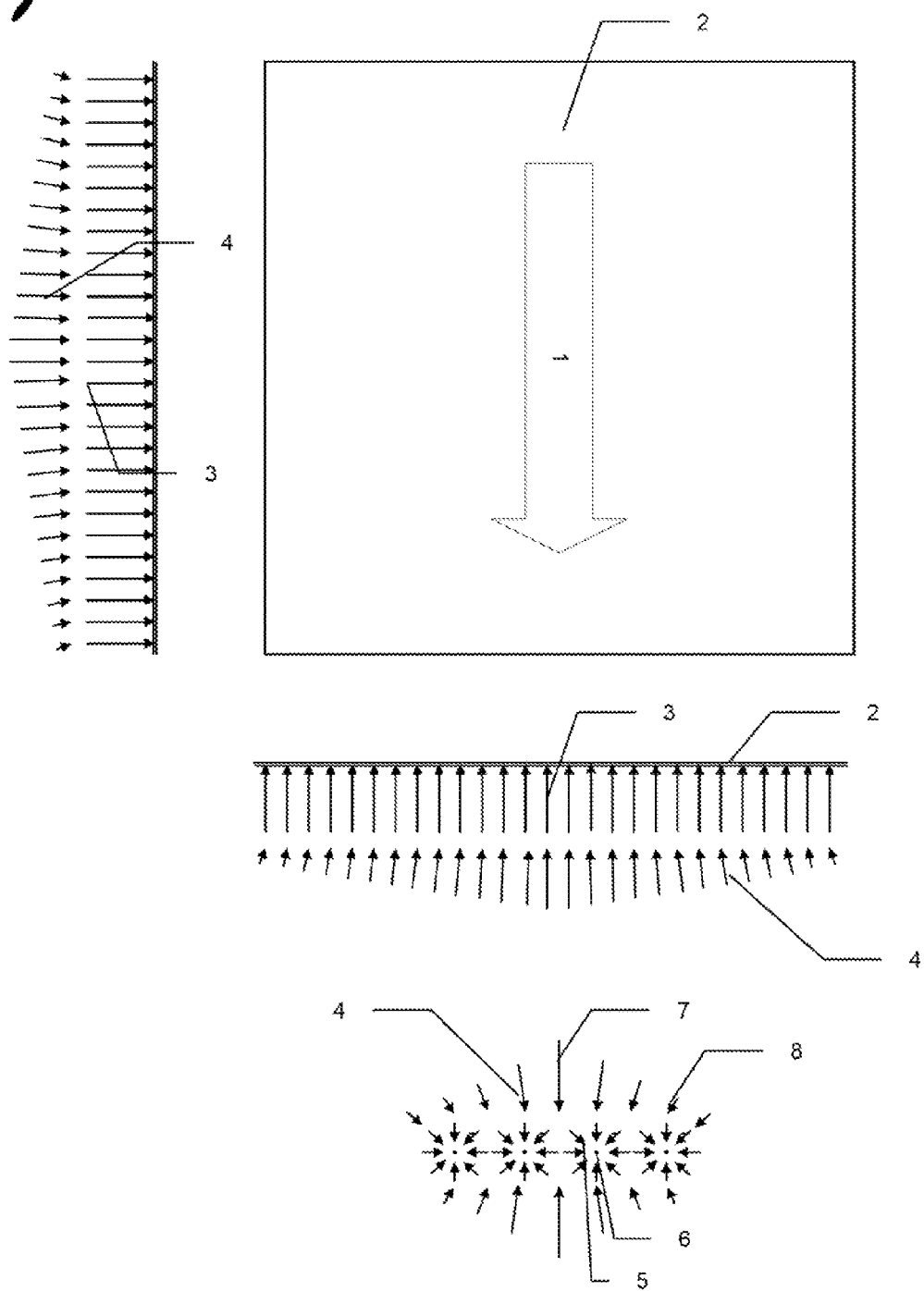
FIG. 2 illustrates relative velocity electric fields from a charged flat conductive sheet moving edgewise.

FIG. 2 shows an example of amplifications of relative velocity electric fields based on charge geometries. Amplification of the relative velocity electric field is observed near the center of a charged flat conductive sheet 2 moving edgewise 1 when viewed perpendicular to the faces of the charged flat conductive sheet 2 from a different inertial frame of reference. The static electric field 3 from a static charge on a charged flat conductive sheet 2 is based on the electric field being at or near zero inside the conductive flat plane. This results in a static electric field 3 perpendicular to the surfaces of the charged flat conductive sheet 2. The relative velocity electric field 4 when viewed perpendicular to the faces of the moving charged flat conductive sheet 2 in a different inertial frame of reference is the relative velocity electric field 4 from the cross product of the velocity and the electric charge.

This relative velocity electric field 4 is at or near zero in the inertial frame of reference of the moving charged flat conductive sheet 2. But this relative velocity electric field 4 does not need the relative velocity electric field 4 to be at or near zero inside the conductive flat plane when viewed from a different inertial frame of reference. This allows for an amplification of the relative velocity electric field 4 at or near the center of the moving charged flat conductive sheet 2 when viewed from a different inertial frame of reference. The shape of the relative velocity electric field 4 has a shape that is similar to the static field that a stationary uniformly charged flat insulated sheet has from its static charge. This amplification is caused by the non-perpendicular relative velocity electric field components 5 from the cross product of the electric charge 6 and their velocities to reinforce each other at or near the center of the sheet 7, and not at the edges 8.

This amplification is greatest on a thin flat smooth surface that allows for a maximum continuous alignment of the electric field lines from the electric charges. This amplification is not observed on a curved or rounded surface or on a rough surface or on in a material composed of conductive particles in a high resistance matrix where the electric field lines do not continuously line up. This effect is greater for negatively charged metallic surface than for a positively charged surface. This effect is due to the mobile negative charges residing on the last few atomic layers of the outer surface where the fixed positive charges occupy the whole thickness of the metallic film.

Figure 3:
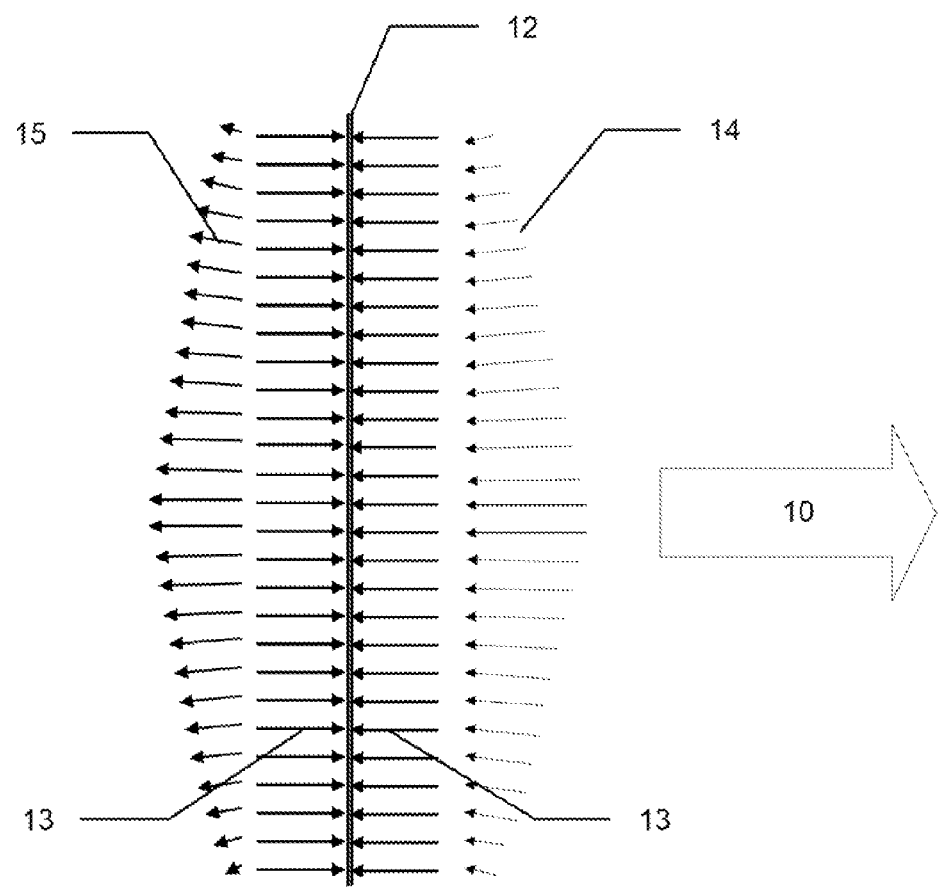
FIG. 3 illustrates relative velocity electric fields from a charged flat conductive sheet moving broadside.

FIG. 3 shows amplifications of the relative velocity electric fields based on charge geometries. This amplification of the electric field is observed on the faces of the charged flat conductive sheet 12 moving broadside 10 when viewed from the direction of motion from a different inertial frame of reference. The static electric field 13 from a static charge on a conductive flat plane has the requirement that the electric field is at or near zero inside the conductive flat plane. This results in a static electric field 13 being perpendicular to the surface of the conductive flat plane. The relative velocity electric field 14 and 15 observed when viewed from the direction of motion is based on the relative velocity electric potential from the dot product of the velocity and the electric charge. This results in the relative velocity electric field from the dot product of the velocity and the electric charge that adds to the static electric field 13 when the charged flat conductive sheet is moving toward a point; and subtracts from the static electric field 13 when the charged flat conductive sheet is moving away from a point. The shape of the relative velocity electric field 14 and 15 has a shape that is similar to the static field that a stationary charged flat insulated sheet has from its static charge. This amplification is caused by the non-perpendicular relative velocity electric field components of the electric scalar potential to reinforce each other at or near the center of the sheet and not at the edges.

Amplifications of the relative velocity electric fields based on charge geometries from the relative velocity electric potential is also observed at the edges of a rotating flat surface, and on the faces of a rotating curved surface. The electric field from the relative velocity electric potential is also observed below and above rough surfaces and in materials having conductive particles in a high resistance matrix when they are in relative motion.

Figure 4:
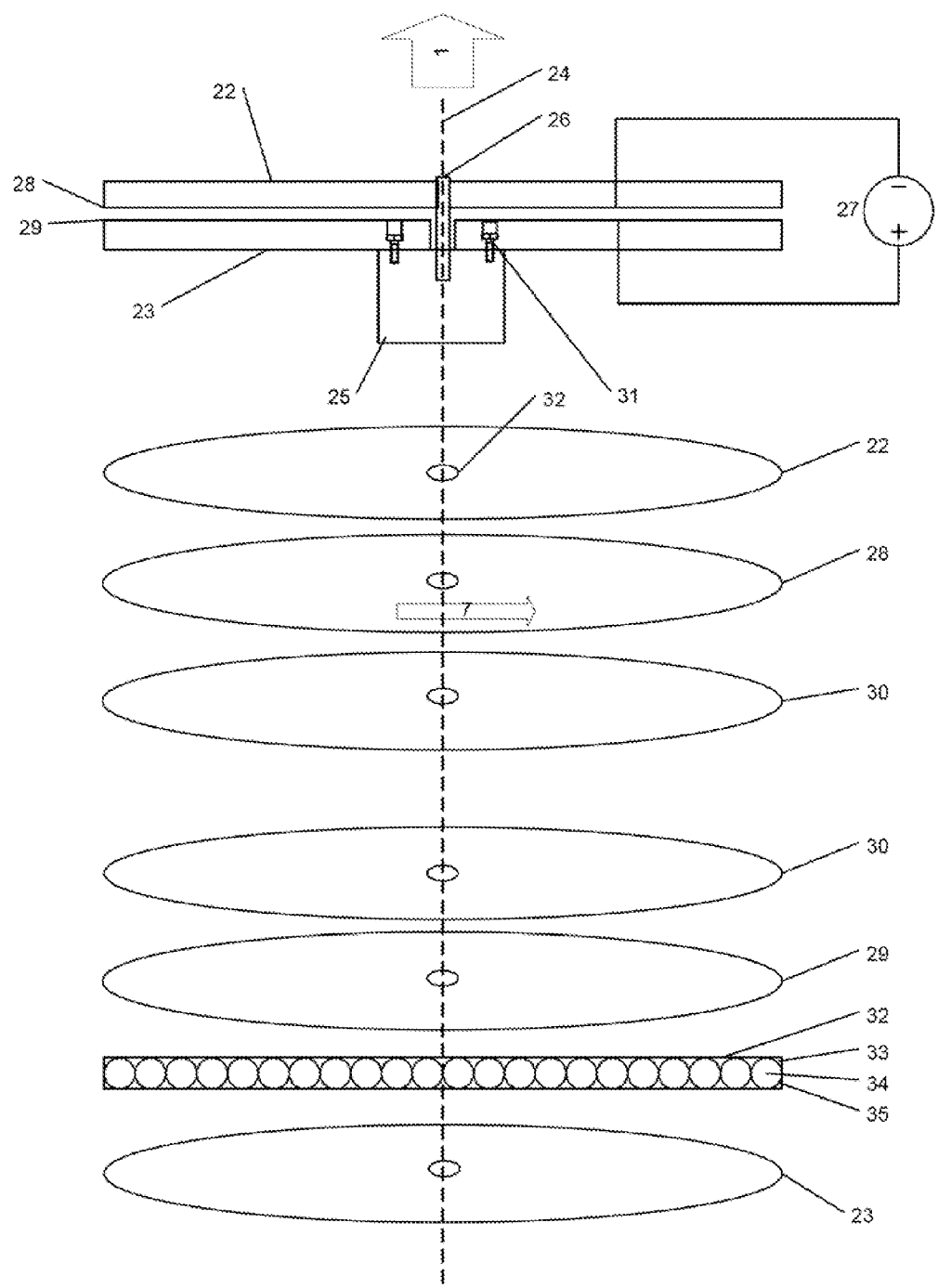
FIG. 4 illustrates an assembly of one rotating charged disk and one stationary disk.

FIG. 4 shows a method to generate an axial force 1 by rotating a first disk 22 against a second fixed disk 23 about a rotation axis 24. The rotating disk 22 has a flat smooth conductive coating 28 charged to a large negative potential. The fixed disk 23 has a high resistance coating 29 charged to a large positive potential. In an example, the rotating disk 22 is connected to a rotation mechanism 25 by way of the motor shaft 26 which rotates the rotating disk 22. The conductive coatings on the two disks are charged to opposite polarities (e.g., by a voltage source 27) and the rotating disk 22 is rotated. The rotation of the rotating disk 22 against the fixed disk 23 allows the fixed disk 23 to experience a relative velocity electric field from the flat smooth conductive coating 28 on the rotating disk 22. The static electric field from the charges on the high resistance coating 29 on the fixed disk 23 interacts with the relative velocity electric field from the flat smooth conductive coating 28 on the rotating disk 22 to create an axial force 1 on the charges on the high resistance coating 29 on the fixed disk 23. The relative motion of the fixed disk 23 relative to the rotating disk 22 allows the charges on the flat smooth conductive coating 28 on the rotating disk 22 to observe a relative velocity electric field from the charges on the high resistance coating 29 on the fixed disk 23. This allows the static electric field from the charges on the flat smooth conductive coating 28 on the fixed disk 23 to interact with the relative velocity electric field from the charges on the high resistance coating 29 on the fixed disk 23 to generate a rotational force 7 on the charges on the flat smooth conductive coating 28 of the rotating disk 22 the resists the rotation of the rotating disk 22.

The rotating disk 22 is a thin non-conducting disk with a flat smooth conductive coating 28 on its lower surface that allows the disk to hold an electric charge. In an example, the flat conductive coating 28 is coated over with a high dielectric insulating coating 30 to enhance the flat conductive coatings 28 ability to hold a charge. The rotating disk 22 is mechanically attached to the motor shaft 26 through a centered hole 32 in the rotating disk 22 such that the disk rotates around the rotation axis 24.

In an example, the rotating disk 22 has a thin smooth flat conductive coating 28 to reduce or minimize the relative velocity electric field from the dot product of the potential and the velocity of the rotating charges observed on or below the surface of the disk. In another example, the rotating disk 22 flat conductive coating 28 may maximize the relative velocity electric field components from the cross product of the potential and velocity and velocity of the rotating charges below the surface of the disk.

The rotating disk 22 is electrically charged to a negative potential by any suitable means. The rotating disk 22 rotates around the rotation axis 24 and the charges on the flat conductive coating 28 now represent a rotating convection current. In an example, the rotating disk 22 is charged by a voltage source such as by electronic, electrostatic, mechanical, through-induction or chemically (e.g., a battery).

The fixed disk 23 may be embodied as a thin non-conducting disk connected to the case of the rotation mechanism 25 by way of fastener(s) 31. When the rotating disk 22 is rotated, the fixed disk 23 has a relative velocity to the rotating disk 22 from the rotation of the rotating disk 22. The top of the fixed disk 23 is coated with a thin layer of a high resistance coating 29. In an example, the high resistance coating 29 is coated with a high dielectric insulating coating 30 to enhance the high resistance coatings 29 ability to hold a charge.

The fixed disk 23 has a high resistance coating 29 applied to reduce or minimize the relative velocity electric field from the cross product of the potential and the velocity of the rotating charges observed above the surface of the disk. In another example, the high resistance coating 29 on fixed disk 23 increases or maximizes the relative velocity electric field components from the dot product of the potential and the velocity of the rotating charges observed above and below the surface of the disk.

The high resistance coating 29 on the fixed disk 23 may be charged to a high positive potential by any suitable means. In an example, the high resistance coating 29 is charged by a voltage source such as electronic, electrostatic or mechanical, thru induction or chemical actions (e.g., a battery).

The flat smooth conductive coating 28 may be a thin smooth conductive coating, such as a metal film. This coating may be thin and smooth to reduce or minimize the electric field from the dot product of the velocity and electric charge above or below the surface of the metallic film. This type of conductive surface is charged with the negative mobile electric charges in metallic compounds, as opposed to the positive charges fixed in a metallic compound. When a metallic surface is charged with a negative charge, the negative charge resides in the last few atomic layers of the outer surface of the metallic surface. This creates a surface of charge that is thinner than the actual metallic film. The smoother the flat smooth conductive coating 28, the easier for the last few atomic layers of negative charge to remain aligned to reduce or minimize the relative velocity electric field from the potential due to the dot product of the velocity and electric charge observed above or below the surface of the metallic surface. Instead the relative velocity electric field from the potential from the dot product of the velocity and electric charge may be observed at the edges of the disk.

The interaction of the relative velocity electric field from the cross product of the velocity and electric charge on the flat smooth conductive coating 28 and the charges on the high resistance coating 29 is the effect that generates the axial force 1.

The flat smooth conductive coating 28 may be coated with an ultra-high dielectric insulating coating 30 to prevent flash over of the charge from one disk to the other disk (e.g., if opposite charges are used to charge the disks). The insulating coating 30 may be an ultra-high dielectric material that allows a greater charge to be applied to the disk than would exist without the coating.

The flat smooth conductive coating 28 may be used to coat the entire side of the disk to form a charged disk, or only coat the outer edge of the disk to form a charged ring, because the inner portions of the disk have a low velocity and thus do not add to the relative velocity electric field to any great effect.

The high resistance coating 29 may be a thicker conductive coating, such as a conductive high resistance material having conductive macroscopic or microscopic or nanoscopic conductive spheres 34. This coating may be applied sufficiently thick to have one or more continuous layers of conductive spheres 34. The high resistance coating 29 may have a resistance low enough to allow the conductive spheres 34 to accumulate sufficient charge to have a potential equal to or more than the potential applied to the high resistance coating 29 by the voltage source 27. But the high resistance coating 29 needs to have a high enough resistance to make sure all of the electrical charge in the coating is on the conductive spheres 34. This coating may be an insulating coating (e.g., if another method is used to charge the conductive spheres 34, such as by tunneling or percolation of the electrical charge).

The conductive spheres 34 embedded in the high resistance coating 29 may be solid, low-resistance conducting spheres, or non-conducting spheres coated with a low resistance conductive coating 35. The conductive spheres 34 may be hollow to minimize their weight. These conductive spheres 34 may be replaced with conductive aligned platelets with the flat surfaces perpendicular to the direction of rotation. The conductive spheres 34 may be used in the high resistance coating 29 to minimize the effect of amplification of the non-perpendicular relative velocity electric field from the cross product of the velocity, by not allowing the individual electric charge field lines to continuously line up on as these do on a flat surface.

The conductive spheres 34 in the high resistance coating 29 also presents a non-smooth surface composed of the rounded faces of the conductive spheres 34. The rounded faces of conductive spheres 34 presents a non-horizontal surface that allows the relative velocity electric field from the potential from the dot product of the velocity and electric charge to be observed above and below the high resistance coating 29. Normally a smooth flat charged surface cancels out this new potential. However, the size and shape of the conductive particles 34 may be selected to maximize amplification of the potential observed from the dot product of the velocity and electric charge above and below the high resistance coating 29.

This new potential from the dot product of the velocity and electric charge by the rotating charges on the flat smooth conductive coating 28, is observed as an added relative velocity electric field that generates a rotational force 7 that resists rotation of the rotating disk 22.

The high resistance coating 29 is coated with an ultra-high dielectric insulating coating 30 to prevent flash over of the charge from one disk to the other disk if opposite charges are used to charge the disks. The insulating coating 30 being an ultra-high dielectric material allows a greater charge to be applied to the disk than would otherwise exist without the coating.

The high resistance coating 29 may coat the entire on side of the disk to form a charged disk, or coat only the outer edge of the disk to form a charged ring because the inner portions of the disk have a low velocity and don't add to the relative velocity electric field by any great effect.

The rotation mechanism 25 may be any suitable means for rotating the disk 22. In an example, the rotating means may be a motor (electric, thermodynamic, molecular, pneumatic, hydraulic or synthetic) or a combination thereof, or other suitable means. In an example, the rotation mechanism 25 is an electric motor.

The rotation mechanism 25 rotates the rotating disk 22 at speeds that increase or optimize the effect axial force 1 on the fixed disk 23 and the rotational force 7 on the rotating disk 22.

The rotation mechanism 25 rotates the rotating disk 22 at speed(s) to increase or optimize the complex electric fields from the velocity of the rotating charges, while not exceeding the mechanical breakdown speed of the rotating disk. In an example, the rotation mechanism 25 rotates the rotating charged disk 22 at speeds greater than 1,000 rpm (rotations per minute), or even at 3600-7200 rpm or more.

Figure 5:
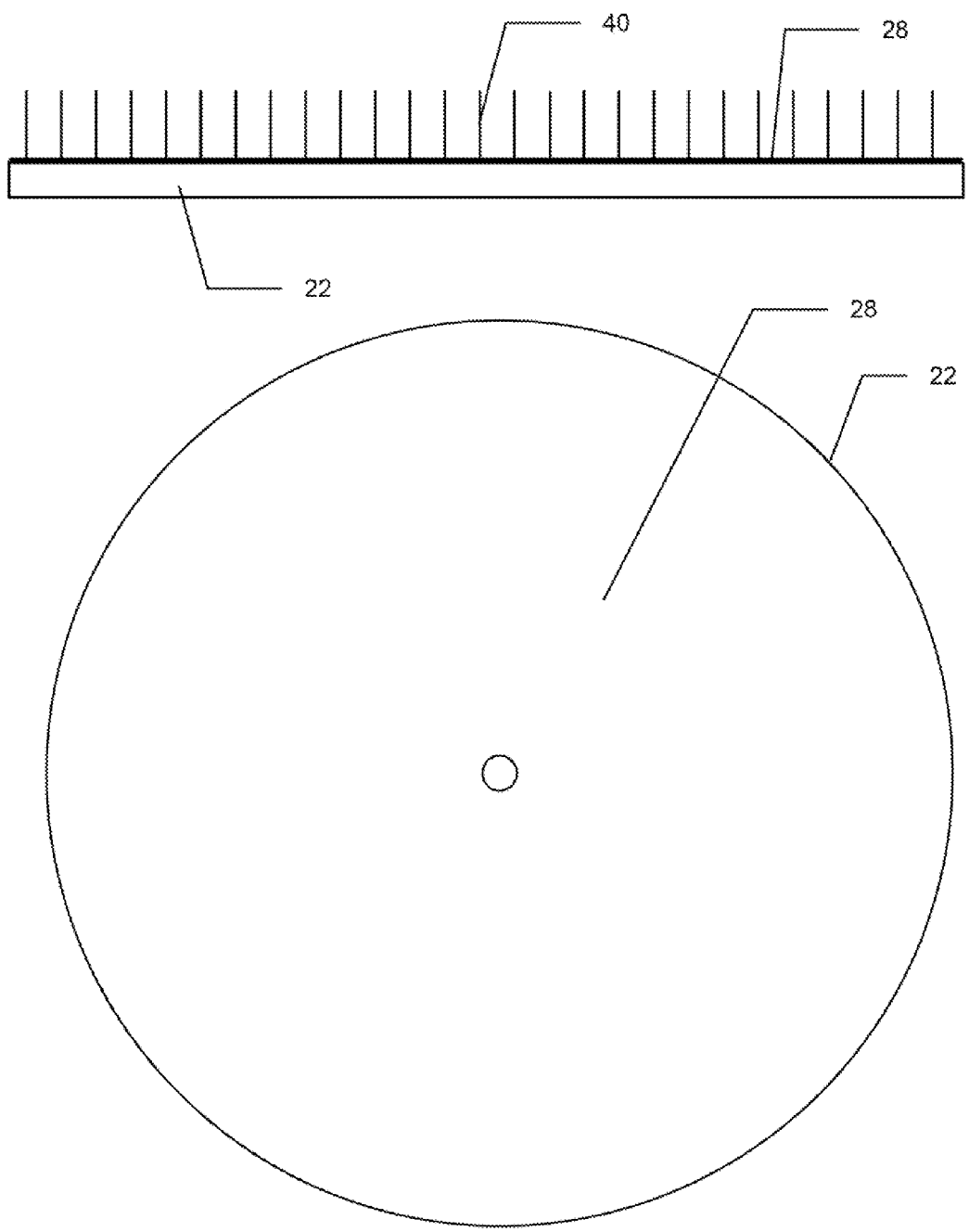
FIG. 5 illustrates a static electric field from the rotating smooth disk in FIG. 4.

FIG. 5 shows a static electric field 40 from the rotating disk 22 corresponding to the example in FIG. 4 when the flat conductive coating 28 is electrically charged to a large negative potential. When the flat conductive coating 28 is electrically charged with a negative charge, the result is flat static electric field 40. The static electric field 40 is based on the electric field inside the flat conductive coatings 28 being near or equal to zero Volts/meter. This results in the static electric field 40 from the conductive coating 28 on the rotating charged disk 22 being perpendicular to the face of the rotating disks 22 flat conductive coatings 28.

Figure 6:
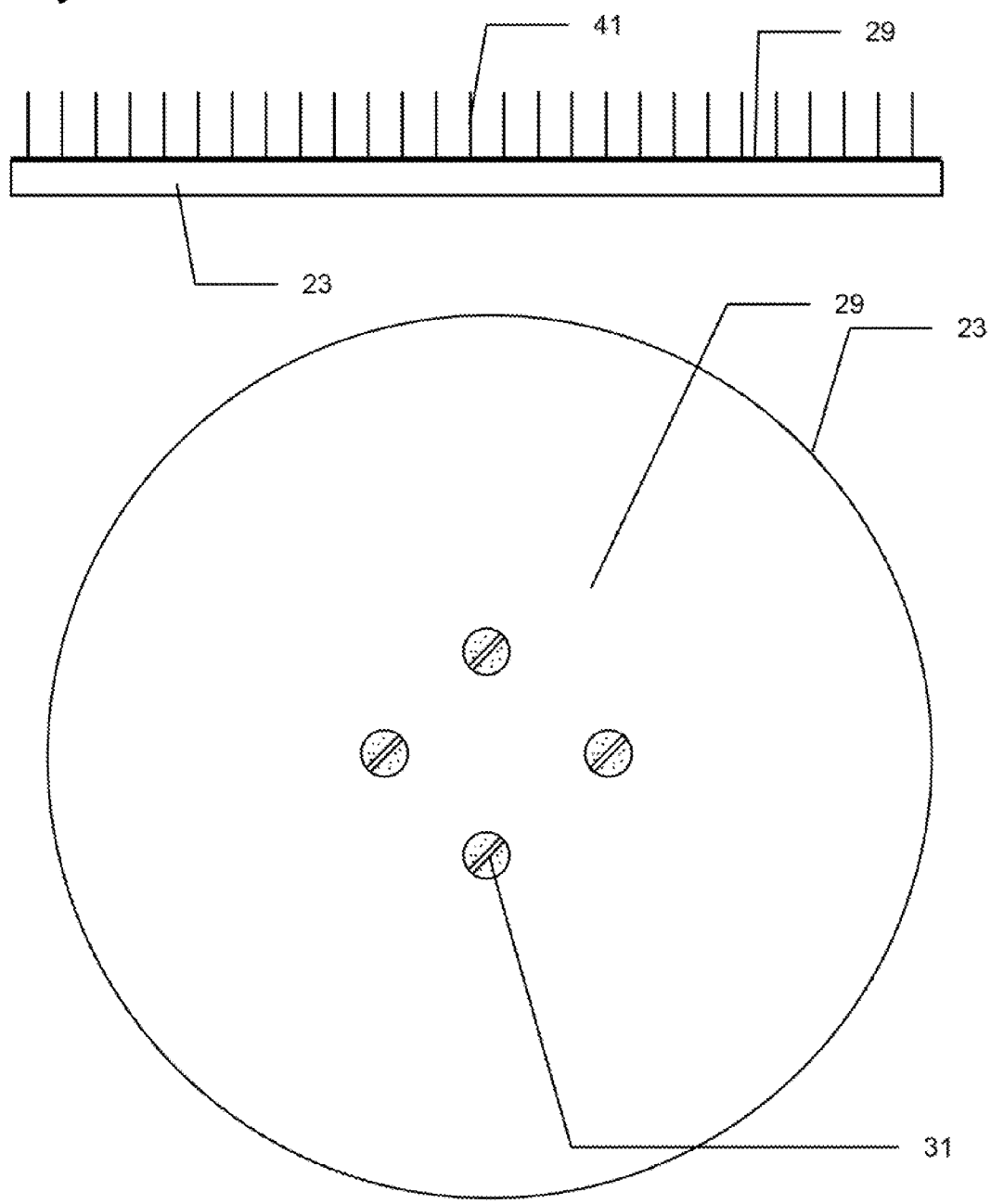
FIG. 6 illustrates a static electric field from the rotating high resistance coating on the fixed disk in FIG. 4.

FIG. 6 shows the static electric field 41 from the fixed disk 23 corresponding to FIG. 4 when the conductive coating 29 is electrically charged. When the conductive coating 29 is electrically charged with a positive charge, it has the resulting static electric field 41 that approximates the field of a rough flat surface. The resulting static electric field 41 has the electric field inside the high resistance coating 29 at or near zero Volts/meter, as in a low resistance conductor. This results in the static electric field 41 from the conductive coating 29 on the fixed disk 23 being approximately perpendicular to the face of the high resistance coating 29 on the fixed disk 23.

The two static electric fields from both disks may be observed by the charges of both disks, and generate an attractive force between the disks if the disks are of opposite potentials. If the disks are of the same potential, then the disks generate a repulsive force between the disks. There is no force along the axis of rotation of these disks when they are not in relative motion to one another.

Figure 7:
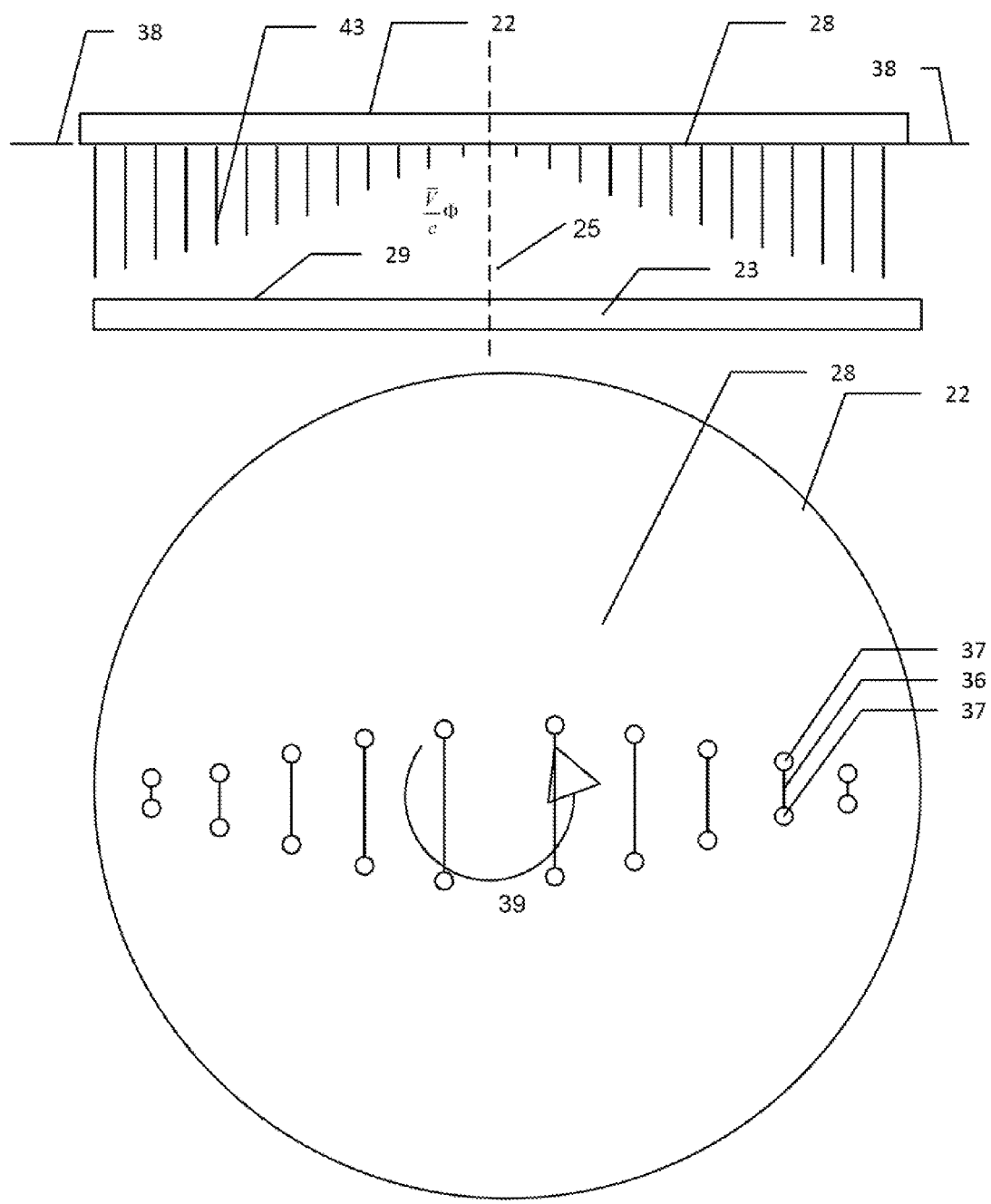
FIG. 7 illustrates a relative velocity electric potential on the fixed disk from the charged rotating disk in FIG. 4.

FIG. 7 shows the relative velocity electric potential 43 on the flat conductive coating 28 on the rotating disk 22 corresponding to FIG. 4 when viewed from the inertial frame of reference of the fixed disk 23. When the flat conductive coating 28 is rotating about a rotation axis 25 and electrically charged with a negative charge, it represents a rotating convection current that has an increasing relative velocity electric potential 43 towards the outside of the fixed disk 23. This is the result of the increased speed that the charges have at the edge of the disk, as compared to the charges near the center of the disk. This creates a complex electric field from the electric potential that includes the static potential and the potential created from the relative motion of the charges on the flat conductive coatings 28 on rotating disk 22 as observed from the inertial frame of reference of the fixed disk 23. This is represented by the following equation:

$$\Phi_{Total} = \Phi_{Static} + \frac{\vec{V}}{c}\Phi_{Static}$$

When the rotating disk 22 is rotating about a rotation axis 25, the velocity of the electric charges increases closer to the edge of the disk increasing the added relative velocity electric potential 43, and results from the effect of the Lorentz Contraction 36 of the electric charges 37 getting greater at the edges of the disk as the rotating disk 22 rotates 39 about a rotation axis 25. The resulting electric field components observed from the inertial frame of reference of the fixed disk 23 of these potentials is represented by the following equations:

$$\nabla\Phi_{Total} = \nabla\Phi_{static} + \nabla\Phi_{due\ to\ velocity}$$

$$\nabla\Phi_{Total} = \nabla\Phi_{static} + \nabla\times\Phi_{due\ to\ velocity} + \nabla\cdot\Phi_{due\ to\ velocity}$$

$$\nabla\cdot\Phi_{due\ to\ velocity} = 0 \text{ For the flat smooth disk}$$

$$\vec{E} = \nabla\Phi_{static} + \nabla\times\Phi_{due\ to\ velocity}$$

The resulting complex electric field components observed from the inertial frame of reference of the fixed disk 23 of these potentials are the components represented by the static electric field and the relative velocity electric field from the cross product of the potential and the relative velocity difference of the disks from their rotation. The electric field component from the potential of the dot product of the potential and the relative velocity difference of the disks is nulled by the smooth thin flat conductive coating 28, and is only going to be observed at the disk edge 38.

Figure 8:
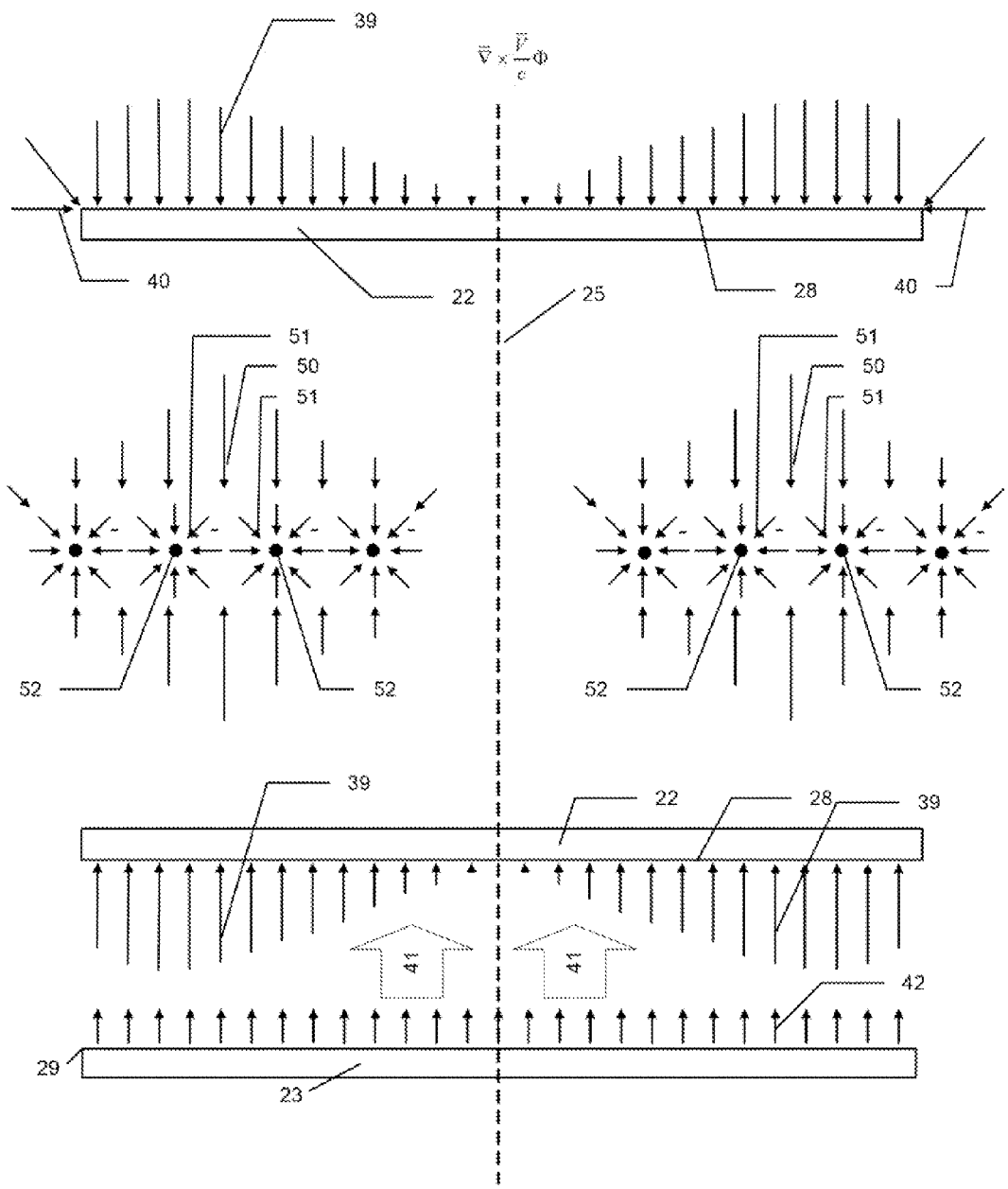
FIG. 8 illustrates a relative velocity electric field on the fixed disk from the charged rotating disk in FIG. 4.

FIG. 8 shows the relative velocity electric field 39 from the rotating disk 22 rotating about a rotation axis 25 for corresponding to FIG. 4, when observed from the inertial frame of reference of the fixed disk 23. The electric field from this electric potential has three new components, plus the static electric field when observed from the inertial frame of reference of the fixed disk 23. The new components, plus the static electric field are described by the following equations:

$$\vec{E} = -\frac{\partial \vec{V}}{\partial t}\frac{\Phi}{c^2} - \vec{\nabla}\times\frac{\vec{V}}{c}\Phi_2 - \vec{\nabla}\Phi_1 \text{ Volt/meter}$$

$$S = \frac{\partial}{\partial t}\frac{\Phi_1}{c} + \vec{\nabla}\cdot\frac{\vec{V}}{c}\Phi_2 \text{ Volts/second}$$

$$0 = \frac{\partial \Phi_1}{\partial t}\text{For a static charge}$$

$$0 = \vec{\nabla}\cdot\frac{\vec{V}}{c}\Phi_2 \text{ Above and below a thin smooth surface}$$

$$0 = \frac{\partial \vec{V}}{\partial t}\frac{\Phi}{c} \text{ Above and below a thin smooth surface}$$

$$\Phi_1 = \frac{\text{Charge}}{\text{Static Capacitance}}\text{Volts}$$

$$\Phi_2 = \frac{\text{Charge}}{\text{Dynamcic Capacitance}}\text{Volts}$$

In this example, only the interaction of the cross product of the potential and the velocity of the charges on the flat conductive coating 28 on the rotating disk 22 and the static electric field 42 on the fixed disk 23 are used to generate the axial force 41. The relative velocity electric field 39 generated by the electric potential produced by the cross product of the velocity and charge density is observed by the charges on the high resistance coating 29 on the fixed disk 23 generates a force on the high resistance coating 29 on the fixed disk 23, which is observed as an axial force 41.

The relative velocity electric field 39 from the added electric potential produced by the cross product of the velocity and charge density does not have the requirement to be 0 Volts/meter inside the flat conductive coating 28 from the inertial frame of reference of the fixed disk 23. The relative velocity electric field 39 from the flat conductive coating 28 without this, allows the neighboring charges 52 to have their non-perpendicular components 51 from their relative velocity electric fields 50 to reinforce each other and allow for the amplification of the relative velocity electric field 39 near the edge of the disk. This gives the total relative velocity electric field 50 a non-flat electric field from at or near the center to the outer edge of flat conductive coating 28.

This relative velocity electric field 39 component is the extra electric field that the fixed disk 23 observes from its inertial frame of reference that the rotating disk 22 does not observe in its inertial frame of reference. This creates an axial force 41 on the high resistance coating 29 on the fixed disk 23 that is not observed on the flat conductive coating 28 on the rotating disk 22.

Figure 9:
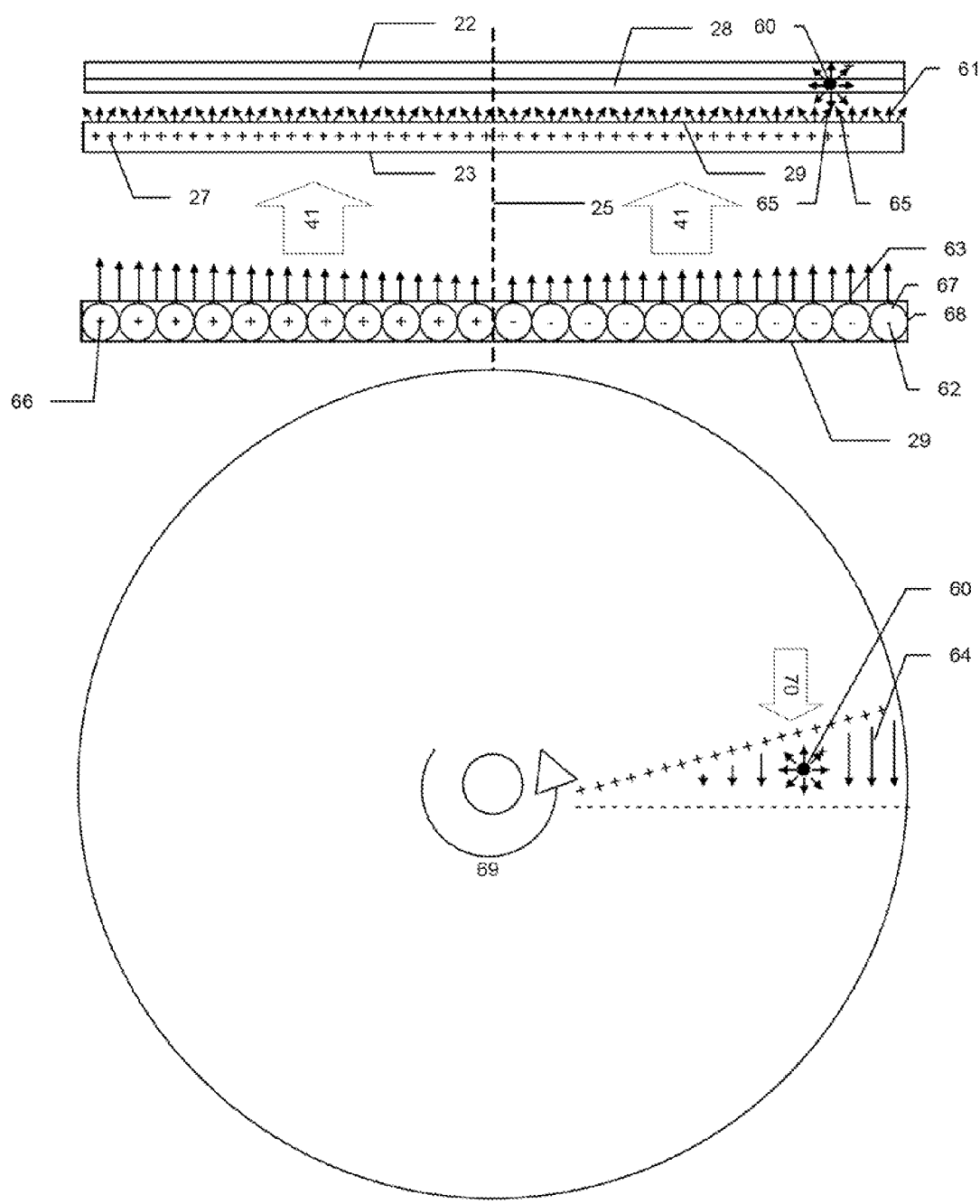
FIG. 9 illustrates a relative velocity electric field on the rotating disk from the charged fixed disk in FIG. 4.

FIG. 9 shows the relative velocity electric potential 61 on the high resistance coating 29 on fixed disk 23 corresponding to FIG. 4 from the inertial frame of reference of the rotating disk 22 when the rotating disk 22 is rotating about a rotation axis 25. When the high resistance coating 29 is electrically charged with a positive charge 27, a rotating convection current is formed with the resulting relative velocity electric potential 61 and scalar electric potentials 62 and 66. The electric potential includes the static electric potential and the relative velocity electric potential 61 created from the relative motion of rotating disk 22 to the fixed disk 23. This is represented by the following equation:

$$\Phi_{Total} = \Phi_{Static} + \frac{\vec{V}}{c}\Phi_{Static}$$

The high resistance coating 29 on fixed disk 23 enables the charges 60 on the flat conductive coating 28 of rotating disk 22 to see the electric field from the scalar electric potentials 62 and 66 of the dot product of the potential, and the relative velocity from the top of the charged spheres 67 in the high resistance coating 29 on the fixed disk 23. The thin, smooth flat conductive coating 28 of rotating disk 22 shields the charges on the fixed disk 23 from the electric field created by the dot product of the potential and the velocity of the static charges on the rotating disk. The two disks now experience two different relative velocity generated electric fields from these different electric potentials based on the different internal geometries of the different surfaces.

The resulting electric field components observed by rotating disk 22 from the relative velocity differences of rotating disk 22 to the fixed disk 23 are represented by the following equations:

$$\nabla \Phi_{Total} = \nabla \Phi_{static} + \nabla \Phi_{due\ to\ velocity}$$

$$\nabla \Phi_{Total} \nabla \Phi_{static} + (\nabla \times \Phi_{due\ to\ velocity} + \nabla \cdot \Phi_{due\ to\ velocity})$$

$$\vec{E} = \nabla \Phi_{static} + (\nabla \times \phi_{due\ to\ velocity} + \nabla \cdot \phi_{due\ to\ velocity})$$

These new electric field components, plus the static electric field, are described by the following equations:

$$\vec{E} = -\frac{\partial \vec{V}}{\partial t}\frac{\Phi}{c^2} - \vec{\nabla} \times \frac{\vec{V}}{c}\Phi_2 - \vec{\nabla}\Phi_1 \text{ Volt/meter}$$

$$S = \frac{\partial}{\partial t}\frac{\Phi_1}{c} + \vec{\nabla} \cdot \frac{\vec{V}}{c}\Phi_2 \text{ Volts/second}$$

$$0 = \frac{\partial \Phi_1}{\partial t} \text{ For a static charge}$$

$$0 = \frac{\partial \vec{V}}{\partial t}\frac{\Phi}{c} \text{ Above and below the disk}$$

$$\Phi_1 = \frac{\text{Charge}}{\text{Static Capacitance}} \text{ Volts}$$

$$\Phi_2 = \frac{\text{Charge}}{\text{Dynamcic Capacitance}} \text{ Volts}$$

The electric field components observed from the rotating disk 22 are the relative velocity electric field components from the dot product of the potential, and the relative velocity and cross product of the relative velocity, and the charge density. The acceleration generated electric field from the angular acceleration is only observed at the edge of the disk.

The relative velocity electric field created by the added electric potential produced by the cross product of the relative velocity and charge density is different than the relative velocity electric field from a flat surface. The amplification of the non-perpendicular relative velocity electric field 65 components of the relative velocity electric field from the flat conductive coating 28 is not observed with the high resistance coating 29. There appears to be no amplification with the macroscopic or microscopic or nanoscopic spheres 67, due to there being no continuous line of the electric field components to reinforce each other from the curved surfaces on the spheres 67 in the high resistance coating 29 on fixed disk 23.

The relative velocity electric field from the scalar electric potentials 62 and 66 observed from the inertial frame of reference of the rotating disk 22 is the dot product of the potential and the relative velocity difference from the rotating disks observed by the charges 60 on the flat conductive coating 28 on the rotating disk 22. The scalar electric potentials 62 and 66 observed by the charges 60 on the flat conductive coating 28 on the rotating disk 22 is approximately represented by the following equations:

$$\Phi_{Total} = \Phi_{Static} + \left(\vec{\nabla} \cdot \frac{\vec{V}}{c}\Phi_{Static}\right)t \text{ volts [For approaching charges]}$$

$$\Phi_{Total} = \Phi_{Static} - \left(\vec{\nabla} \cdot \frac{\vec{V}}{c}\Phi_{Static}\right)t \text{ volts [For receding charges]}$$

The relative velocity electric field 64 observed from the scalar electric potentials 62 and 66 generates an electric field that interacts with the charges 60 on the flat conductive coating 28 on the rotating disk 22 to generate a rotational force 70 that resists the rotation of the rotating disk 22. This relative velocity electric field 64 is observed as an electric field gradient 64 that generates a drag force 70 on the moving electric charges 60 on the flat conductive coating 28 on the rotating disk 22. This force is near or equal to the axial force 41 observed on the charges in the high resistance coating 29 on the fixed disk 23.

The time component in these equations implies that if the increase in the scalar electric potential 66 created by the moving charged spheres 67 in the high resistance coating 29 is not offset by the decrease in the scalar electric potential 62, there is a decoupled buildup of electrical potential. This buildup is observed whenever the moving electric charges 60 experience angular acceleration which keeps the decrease in scalar electric potential 62 from completely offsetting the increase in scalar electric potential 66. This is observed as an increasing decoupled negative electric field from the inertial frame of reference of the rotating disk 22 on the side of charged spheres 67 nearest the center of the disk and as an increasing decoupled positive electric field on the side of the charged spheres 67 farthest from the center of the disk. This effect is the result of the charges on the charged spheres 67 which do not allow the lead positive scalar electric potential 66 to completely neutralize the following negative scalar electric potential 62 on the charged spheres 67. This buildup in the electric potential results in an increasing new radial electrical field being observed from the fixed disk 23 by the rotating disk 22 along with an increasing electric field gradient 64. This results in an increase in the drag force 70 and an increase in the axial force 41 over time as the device rotates until it predominates and becomes the dominate factor in the device's performance.

Figure 10:
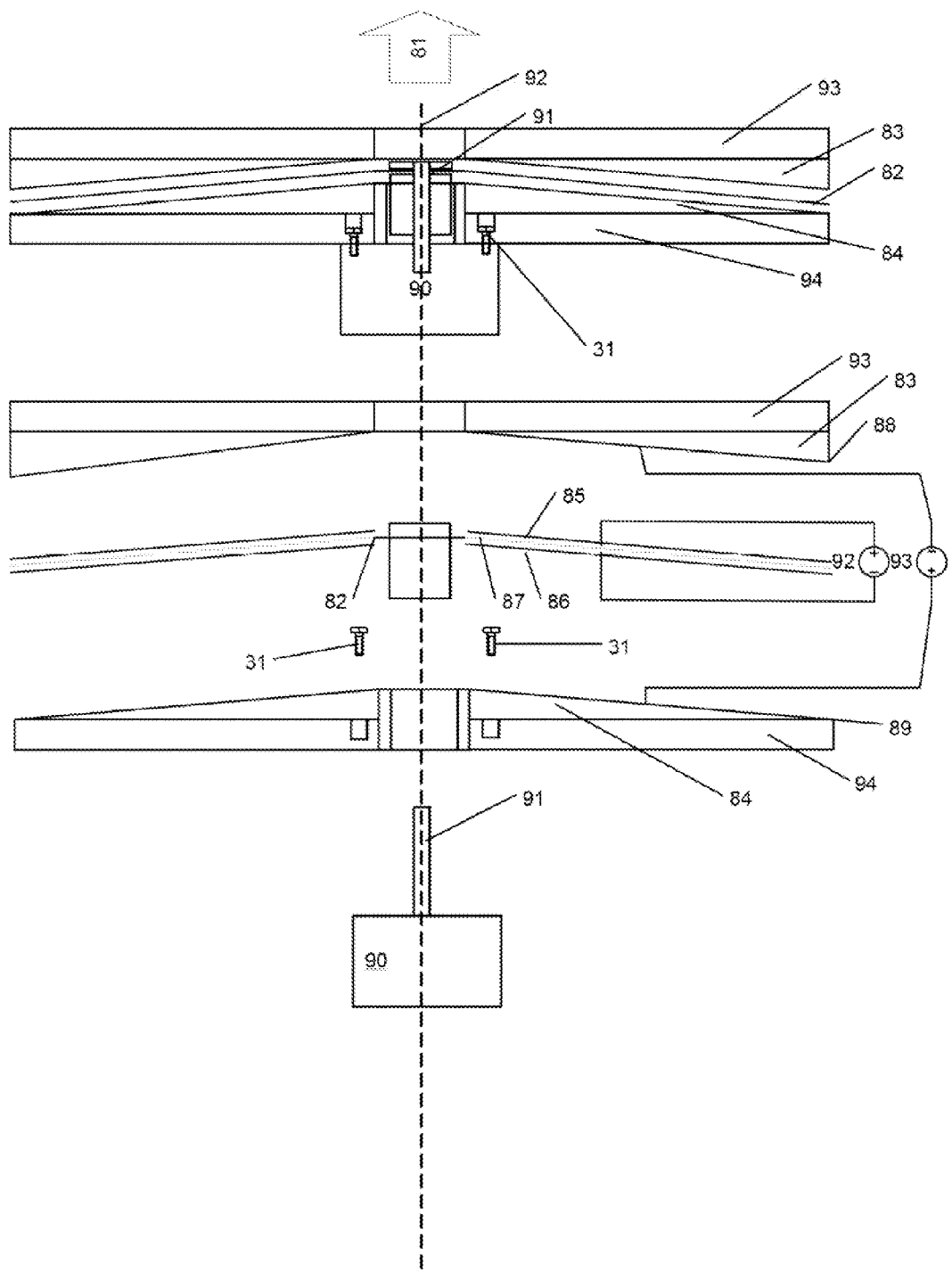
FIG. 10 illustrates one rotating disk and two stationary disks to produce a force along an axis of rotation.

FIG. 10 shows a method to generate an axial force 81 by the rotation of a conical rotating disk 82 about a rotation axis 92. The top fixed disk 83 has a conical shape and has a conductive coating 88 along the bottom of the cone that can accept an electrical charge. The bottom fixed disk 84 has a conical shape and has a conductive coating 89 along the top of the cone that can accept an electrical charge. The rotating disk 82 has a conductive coating 85 on the top side of the rotating disk 82. The rotating disk 82 also has a conductive coating 86 on the bottom side of the rotating disk 82 to form a capacitor. The conductive coatings on the fixed disks are electrically charged to produce a static electric field. The conductive coatings on the rotating disk 82 are electrically charged and rotated to produce an acceleration generated electric field to interact with the static electric fields on the fixed conical disks to generate an axial force 81.

The rotating disk 82 is a thin non-conducting disk with a conductive coating 85 on the top side and another conductive coating 86 on the bottom side. The thin non-conducting disk is made of an ultra-high dielectric material 87 to facilitate the maximum amount of electric charge that may be applied to the conductive coatings. In an example, the conductive coatings 86 and 85 are coated over with a high dielectric insulating coating to enhance the conductive coatings 86 and 85 abilities to hold a charge. The conductive coating 86 is electrically charged to a high negative potential by DC Source 92 while conductive coating 85 is electrically charged to a high positive potential by the same DC Source 92. Rotating disk 82 is mechanically attached to the motor shaft 91 through a centered hole in the rotating disk 82, such that the disk rotates around the rotation axis 92. The angle of the cone is chosen to deliver the maximum angular acceleration created electric field along the axis of rotation for a particular rotation speed and charge.

In this embodiment the rotating disk 82 is made of a material capable of rotation at high speeds when the charged surfaces are electrically charged. In an example, the rotating disk 82 is designed to exceed 3000 rpm.

The top fixed disk 83 is a non-conducting inverted conical shaped disk that has a conductive coating 88 applied to the inside of the inverted conical shaped. The conductive coating 88 is electrically charged to a potential of opposite polarity to the charge applied to the top of the conductive coating 85 on the rotating disk 82. The non-conducting inverted conical shaped disk has a flat top side connected to a flat disk 93 that has a mechanical connection to the case of the rotation mechanism 90. The flat disk 93 is the object to feel the axial force 81 from the interaction of the static field on conductive coating 88 and the angular acceleration generated electric fields from charges on the conductive coating 85 on rotating disk 82.

The bottom fixed disk 84 is a non-conducting inverted conical shaped disk that has a conductive coating 89 applied to the inside of the inverted conical shape. The conductive coating 89 is electrically charged to a potential of opposite polarity to the charge applied to the conductive coating 86 on the rotating disk 82. The non-conducting inverted conical shaped disk has a flat top side connected to a flat disk 94 with a mechanical connection to the case of the rotation mechanism 90. Flat disk 94 is the object to feel axial force 81 from the interaction of the static field on conductive coating 89 and the angular acceleration generated electric fields from charges on conductive coating 86 on rotating disk 82.

The conductive coatings 85, 86, 88, and 89 are thin smooth conductive coatings (e.g., a metal film). The conductive coatings 85, 86, 88, and 89 are coated with an insulating coating to prevent flash over of the charge from one disk to the other disk if opposite charges are used to charge the disks.

The rotation mechanism 90 is any suitable means for the rotating disk 82. In an example, the rotating means utilizes a motor (electric, thermodynamic, molecular, pneumatic, hydraulic or synthetic) or a combination thereof, or any other suitable means. In an example, the rotation mechanism 90 is an electric motor.

The rotation mechanism 90 rotates the rotating disk 82 at speeds that optimizes the angular acceleration generated fields to produce an axial force on the fixed disks 83 and 84.

The rotation mechanism 90 rotates the rotating disk 82 at speed(s) selected or optimized to generate the complex electric fields from the acceleration of the rotating charges, while remaining below the mechanical breakdown speed of the rotating disk. In an example, the rotation mechanism 90 rotates the rotating charged disk 82 at speeds greater than 1,000 rpm (rotations per minute), or even 3600-7200 rpm or greater.

Figure 11:
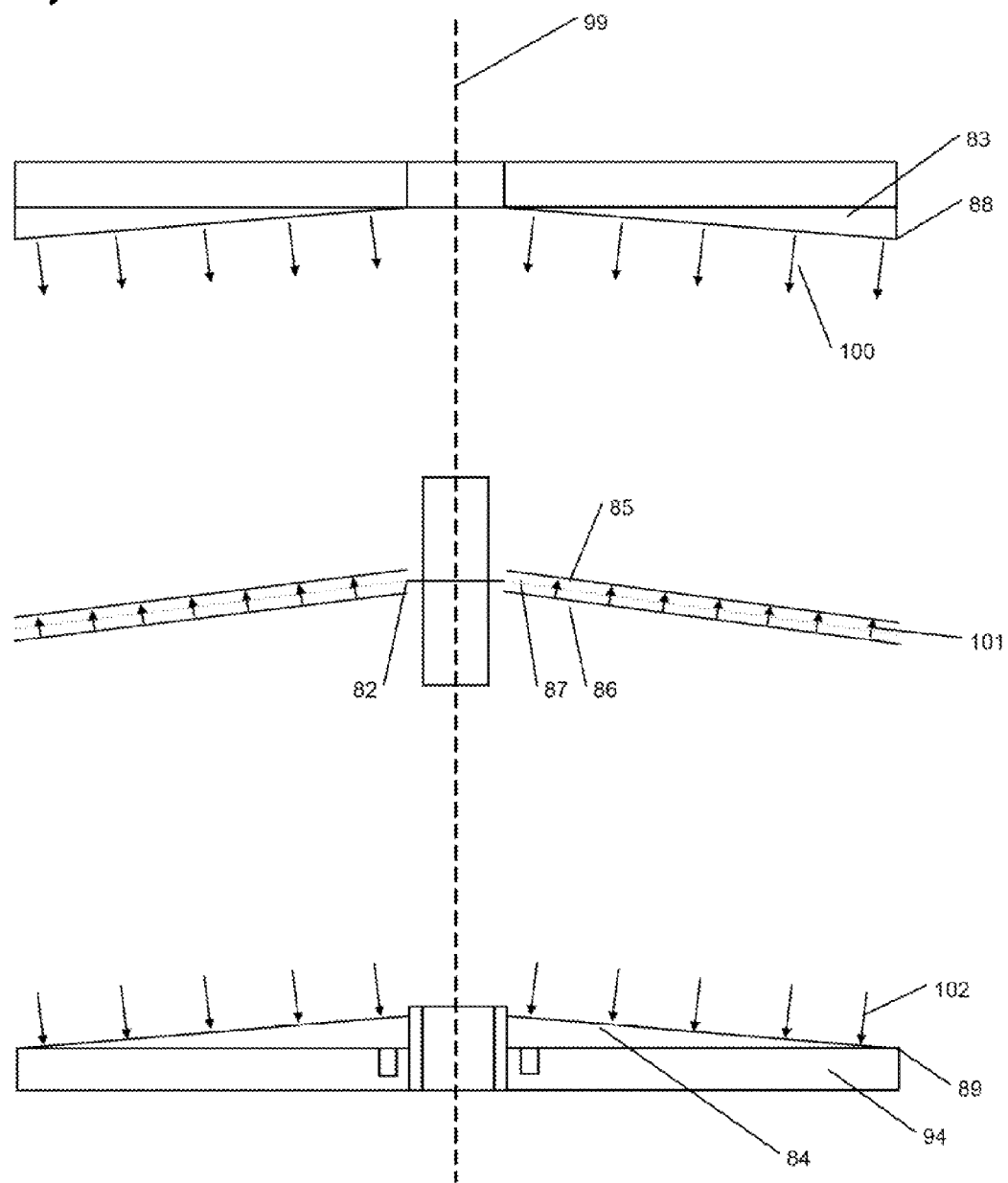
FIG. 11 illustrates a static electric field from the conductive coatings in FIG. 10.

FIG. 11 shows the static electric fields 100, 101, and 102 for the top fixed disk 83, bottom fixed disk 84 and the rotating disk 82, when these are electrically charged. Each has a static electric field perpendicular to the faces of the conductive coatings 85, 86, 88, and 89 with a requirement that the electric field inside the conductive coating is at or near zero.

The two static electric fields 100 and 102 from the charges on the conductive coatings 88 and 89 on the top fixed disk 83 and the bottom fixed disk 84 are observed by charges on the conductive coatings 85 and 86 on the rotating disk 82. The static electric field 101 from the charges on the conductive coatings 85 and 86 on the rotating disk 82 is mostly contained in between the coatings 85 and 86 and is mostly not observed by the charges on the conductive coatings 88 and 89 on the top fixed disk 83 and the bottom fixed disk 84. The net forces from these electric fields generate an attractive force between the disks. There is no force along the axis of rotation 99 of these disks when not in motion relative to one another.

Figure 12:
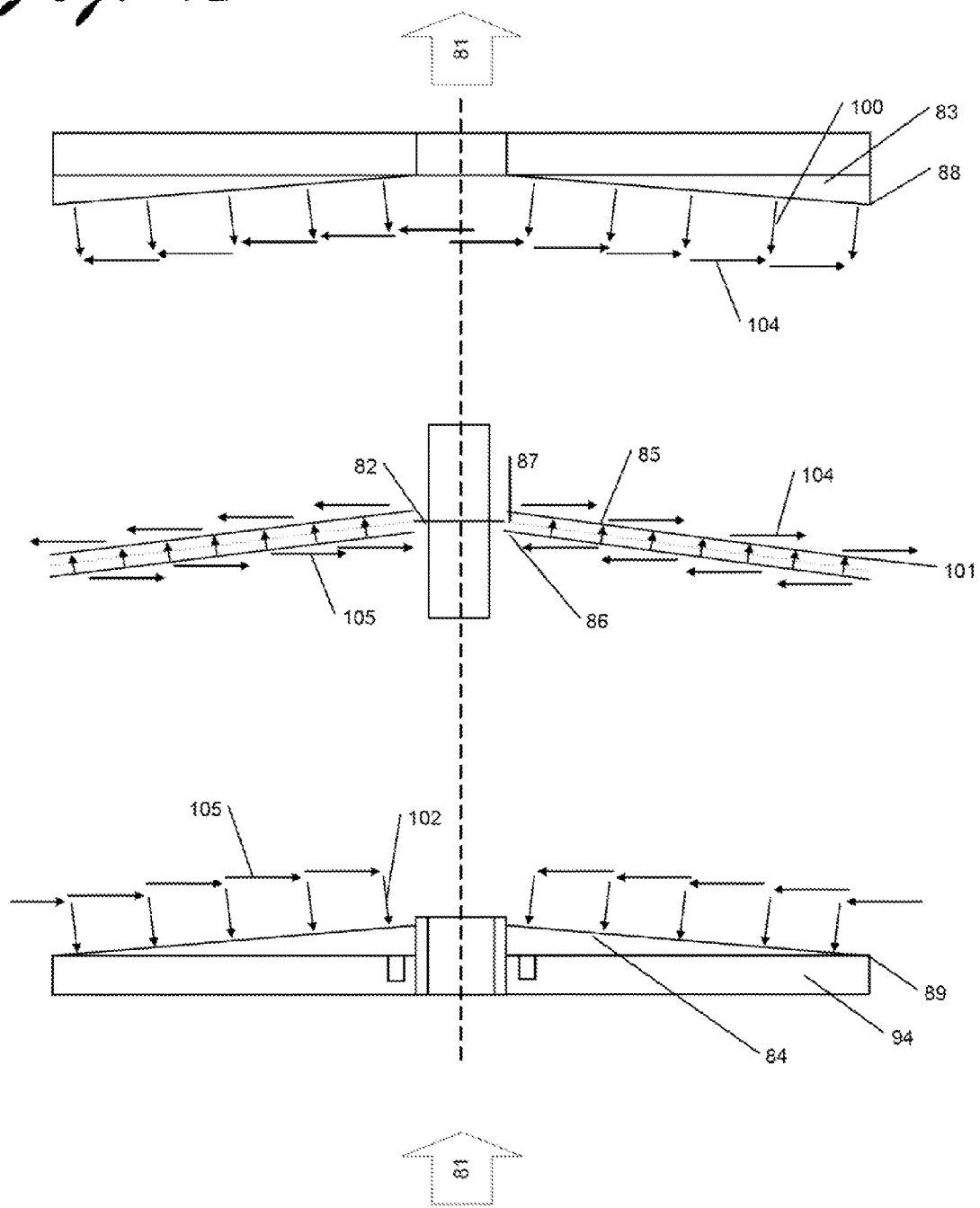
FIG. 12 illustrates the interaction angular acceleration generated electric fields with static electric fields from the conductive coatings in FIG. 10.

FIG. 12 shows interaction of the angular acceleration generated electric fields 104 and 105 and the static electric fields 100 and 102. In this example, the conductive coating 88 on the top fixed disk 83 is charged to a high positive potential (e.g., in the tens of kilovolts range). The conductive coating 89 on the bottom fixed disk 84 is charged to a high negative potential (e.g., in the tens of kilovolts range). The conductive coating 85 on the rotating disk 82 is charged to a high negative potential (e.g., in the tens of kilovolts range). The conductive coating 86 on the rotating disk 82 is charged to a high positive potential (e.g., in the tens of kilovolts range). The conductive coatings 85 and 86 and the ultra-high dielectric material 87 forms a large capacitor that stores a much larger charge on the conductive coatings 85 and 86 than on the conductive coatings 88 and 89.

When charges on the conductive coatings 85 and 86 on the rotating disk 82 are rotated, angular acceleration electric fields 104 and 105 appear. The angular acceleration electric fields 104 and 105 are described by the following equation:

$$\vec{E} = -\frac{\partial \vec{V}}{\partial t} \frac{\Phi}{c^2} \text{ Volt/meter}$$

$$\Phi = \frac{\text{Charge}}{\text{Capacitance}} \text{ Volts}$$

The angular acceleration electric fields 104 and 105 are observed by the charges on the conductive coatings 89 and 88 on the bottom fixed disk 84 and the top fixed disk 83. The angular acceleration electric fields 104 and 105 generated inside the capacitor formed by the conductive coatings 85 and 86 are contained in the ultra-high dielectric material 87, and are mostly not observed on the outside faces of the conductive coatings 85 and 86. The conductive coating 85 on the rotating disk 82 with a negative potential and almost no external static electric field now has a positive electric field from the angular acceleration electric fields 104. The conductive coating 86 on the rotating disk 82 with a positive potential and almost no external static electric field now has a positive electric field from the angular acceleration electric field 105.

The axial force 81 is created on the top fixed disk 83 by the interaction of the positive angular acceleration electric field 104 and the positive static electric fields 100 from the charges on the conductive coatings 88. The axial force 81 is created on the bottom fixed disk 84 by the interaction of the positive angular acceleration electric field 105 and the negative static electric fields 102 from the charges on the conductive coatings 89.

The charges on the conductive coatings 85 and 86 on the rotating disk 82 are also affected by these new fields. This results in an extra radial force on the rotating disk that counteracts the centripetal force of the rotating disk.

Figure 13:
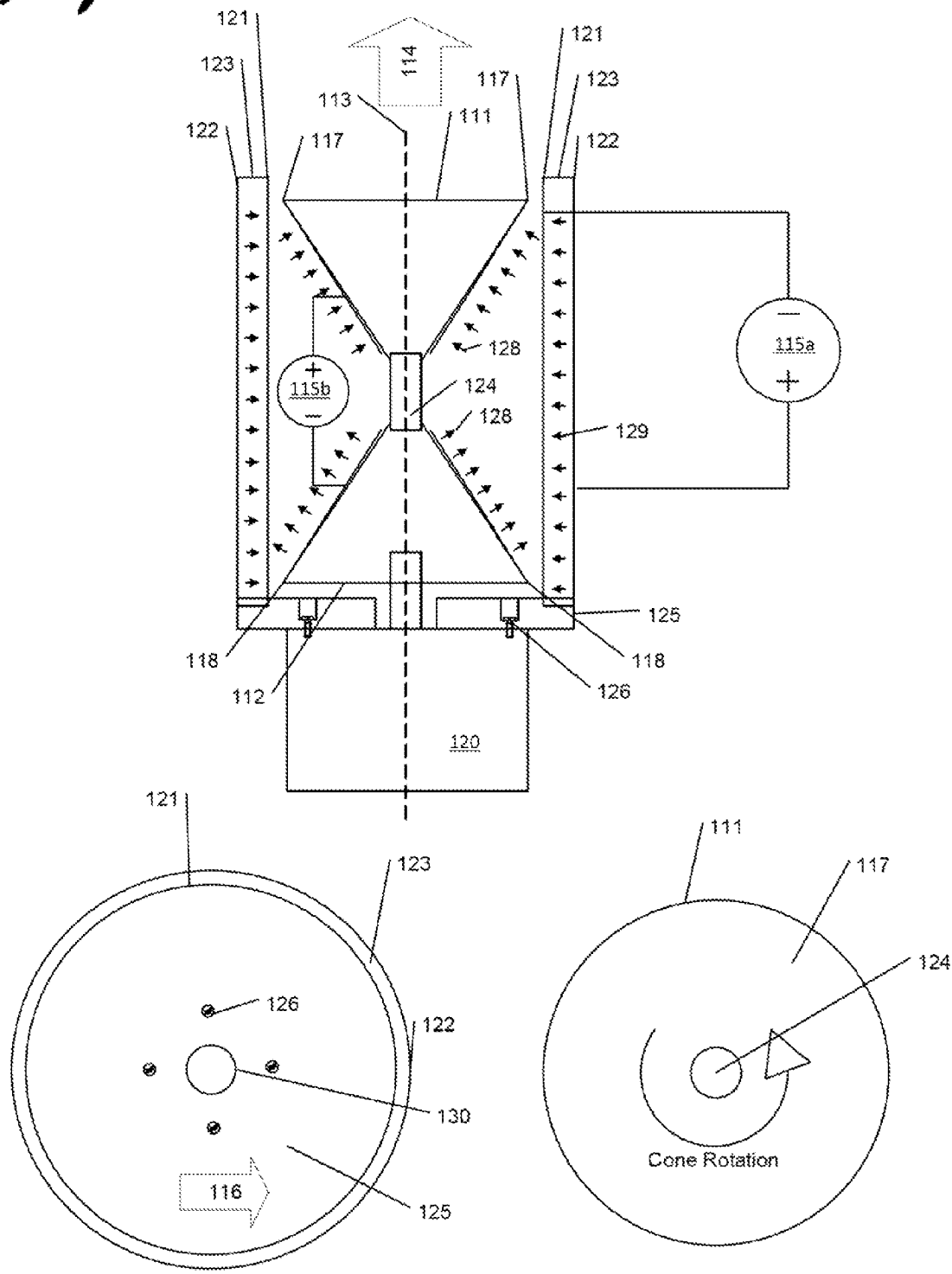
FIG. 13 illustrates two charged rotating cones to generate a longitudinal force on the rotating cones and a rotational force on an outer cylinder.

FIG. 13 shows a method to generate a longitudinal force 114 by the rotation of two charged rotating cones 111 and 112 about a rotation axis 113. In this example an electrical charge is applied from the voltage sources 115a-b to the high resistance coating 117 and 118 that coat the outside of the charged cones 111 and 112, along with the flat smooth conductive coatings 121 and 122 on the stationary cylinder 123. The stationary cylinder 123 is connected to the case of the rotation mechanism 120 through the connection plate 125 with the screw connections 126. The two charged rotating cones 111 and 112 are connected to the rotation mechanism 120 and are rotated about a rotation axis 113. The rotating charges now constitute an electrical convection current that generates a set of complex electric fields that may be used to produce an the longitudinal force 114 and its corresponding reaction rotational force 116.

The flat smooth conductive coatings 121 and 122 are thin smooth conductive coatings generally a metal film. This coating is to be as thin and smooth as possible to minimize the electric field from the dot product of the velocity and electric charge above or below the surface of the metallic film. This type of conductive surface is the surface to take the mobile electric charges which with metallic compounds are the negative charges. When a metallic surface is charged with a negative charge, the negative charge resides in the last few atomic layers of the outer surface of the metallic surface. This effect creates a surface of charge thinner than the actual metallic film. The smoother the surface the fewer atomic layers of negative charge that contribute to the dot product of the velocity and electric charge above or below the surface of the metallic surface. The resulting static electric field 129 is contained between the two flat smooth conductive coatings 121 and 122, and is perpendicular to the surfaces due to the requirement that the electric field inside the flat smooth conductive coatings 121 and 122 is at or near zero.

The flat smooth conductive coatings 121 and 122 are coated with an insulating coating to prevent flash over of the charge from one conductive surface to an oppositely charged surface.

The high resistance coatings 118 and 117 are thicker conductive coatings generally a conductive high resistance material containing conductive macroscopic or microscopic or nanoscopic conductive spheres. This coating is applied to be as thick enough to contain one or more layers of conductive spheres to minimize the amplification of the electric field lines from the cross product of the velocity and electric charge lining up on a flat surface. These high resistance coatings 118 and 117 may be replaced with a curved surface that has a sufficient curve to reduce or minimize amplification of the electric field lines from the cross product of the velocity and electric charge lining up on a thin surface from the view of a different inertial frame of reference.

The high resistance coatings 118 and 117 are coated with an insulating coating to reduce or stop flash over of the charge from one conductive surface to an oppositely charged surface.

The rotating cones 111 and 112 may be constructed with a non-conductive material. The rotating cones 111 and 112 are connected together with an insulated shaft 124 connected to the rotation mechanism 120 and is rotated about a rotation axis 113. The rotating cones 111 and 112 have a high resistance coating 118 and 117 applied to the outside surfaces of the cones to minimize the amplification of the electric field lines from the cross product of the velocity, and electric charge lining up on a thin surface from the view of a different inertial frame of reference. Instead, the cones have a high resistance coating 118 and 117 to maximize the electric field from the dot product of the velocity and electric charge when observed from a different inertial frame of reference.

When the high resistance coatings 118 and 117 of rotating cones 111 and 112 are charged to large potentials, the result is a static electric field 128. There is little or no electric field inside the rotating cones 111 and 112. When the high resistance coatings 118 and 117 on the cone are electrically charged, these have a static electric field 128 perpendicular to the face of the cone and the electric field inside the conductive coating is at or near zero.

In this example, the rotating cones 111 and 112 are charged to opposite potentials. The cones are then rotated by the rotation mechanism 120 to generate a longitudinal force 114 on the assembly.

The stationary cylinder 123 may be manufactured from a non-conductive material. The stationary cylinder 123 has smooth, thin, flat conductive coatings 121 and 122 applied to the inside and outside surfaces of the stationary cylinder 123 to increase or maximize amplification of the electric field lines from the cross product of the velocity and electric charge lining up on a thin surface from the view of a different inertial frame of reference.

The flat smooth conductive coatings 121 and 122 of the stationary cylinder 123 are charged to a large potential and thus has a resulting static electric field 129. There is no static electric field outside the stationary cylinder 123.

The flat smooth conductive coatings 121 and 122 on the stationary cylinder 123 are charged to opposite potentials in this embodiment with the flat smooth conductive coating 121 having the negative charge. The cones are then rotated by the motor to generate the longitudinal force 114 on the assembly.

The rotation mechanism 120 is any suitable means for the two rotating cones 111 and 112. In an example, the rotating means utilizes a motor (electric, thermodynamic, molecular, pneumatic, hydraulic or synthetic) or a combination thereof design, as well as any other means as known in the art. In an example, the rotation mechanism 120 is an electric motor of some type.

The rotation mechanism 120 rotates the rotating cones 111 and 112 at speeds that optimize the effect axial force 114 on the rotating cones 111 and 112 and the rotational force 116 on the stationary cylinder 123.

The rotation mechanism 120 rotates the rotating cones 111 and 112 at speed(s) to enhance or optimize the complex electric fields from the velocity of the rotating charges, while remaining below the mechanical breakdown speed of the rotating cones. In an example, the rotation mechanism 120 rotates the rotating cones 111 and 112 at a speed of greater than 1,000 rpm (rotations per minute), or even at 3600-7200 rpm or higher.

The voltage source 115a provides a voltage difference across the two flat smooth conductive coatings 121 and 122 on the stationary cylinder 123. The voltage source 115b provides a voltage difference across the two high resistance coatings 118 and 117 on the rotating cones 111 and 112. The voltage sources 115a-b produce a DC voltage across the smooth conductive coatings 121 and 122. In an example, the voltage sources 115a and 115b supplies greater than about 1,000 Volts, such as 1,000-100,000 Volts. In an example, the voltage sources 115a and 115b each supply about 1,000 to 10,000 Volts.

Figure 14:
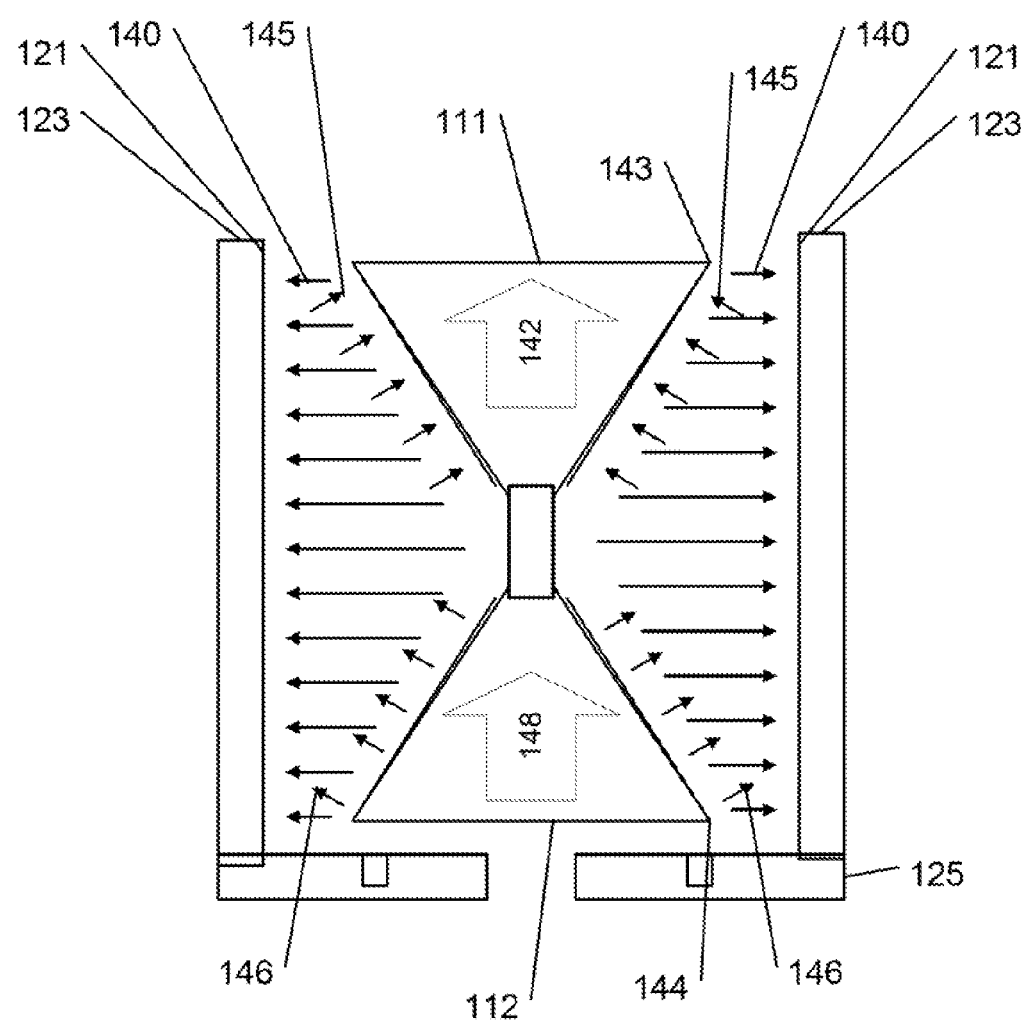
FIG. 14 illustrates a relative velocity electric field on the rotating cones in FIG. 13.

FIG. 14 shows the interaction of the relative velocity electric field 140 observed by the rotating cones 111 and 112 and the static electric fields 145 and 146 from the charge on the rotating cones 111 and 112. The relative velocity electric field 140 observed from the relative motion of the charged surfaces is from the electric potential produced by the cross product of the velocity and charge density on the flat smooth conductive coating 121. In the inertial frame of reference of the rotating cones 111 and 112, the stationary cylinder 123 appears to be rotating while the rotating cones 111 and 112 are stationary. This frame of reference is not valid for the acceleration created electric fields. But this frame of reference is valid for the relative velocity electric fields 140.

The relative velocity electric field 140 does not have the requirement to be zero inside of the conductor from the inertial frame of reference of the rotating cones 111 and 112. The relative velocity electric field 140 that the flat smooth conductive coating 121 has when viewed from the rotating cones 111 and 112 is similar or the same as the electric field that a charged insulator has from a uniform static charge. The relative velocity electric field 140 forms a tent-like shape over the flat smooth conductive coating 121, with the peak intensity of the relative velocity electric field 140 at the center of the cylinder. In this case the non-perpendicular electric field components from the cross product of the velocity and charge density of the relative velocity electric field 140 in the direction of motion reinforce each other at the center of the stationary cylinder 123, and not at the ends to give us the tent shape in the direction of motion.

The longitudinal force 142 observed on the rotating cone 111 is generated from the interaction of the electric field 145 from the negative static electric charges on and the high resistance coating 143 and the relative velocity electric field 140. This is a repulsive force directed upward (relative to the drawing orientation). The longitudinal force 148 observed on the rotating cone 112 is generated from the interaction of the electric field 146 from the positive static electric charges on the high resistance coating 144 and the relative velocity electric field 140. This is an attractive force directed upward (relative to the drawing orientation).

FIG. 15 shows forces from the interaction of the relative velocity electric fields 130 and 131 and the relative velocity electric potentials 133 and 134 and the associated scalar electric field 139 observed by the charges 135 on the flat smooth conductive coating 121 on the stationary cylinder 123. The relative velocity electric fields 130 and 131 observed in the inertial frame of reference of the flat smooth conductive coating 121 on the stationary cylinder 123 is derived from the electric potential produced by the cross product of the velocity and the charge density on the high resistance coating 118 and 117. The amplification of the relative velocity electric fields 130 and 131 at the center of the high resistance coating 118 and 117 is not observed with this type of coating creating a smaller reaction longitudinal force 137 on the stationary cylinder 123 than observed on the cones.

The rotational forces 136 and 138 observed by the negative charges 135 on the flat smooth conductive coating 121 are generated from the interaction of the relative velocity electric field 139 and the stationary charges on the flat smooth conductive coating 121 on the stationary cylinder 123. The relative velocity electric field 139 is created from the electric potential produced by the dot product of the velocity and charge density on the high resistance coating 118 and 117. This creates rotational forces 136 and 138 on the charges 135 on the flat smooth conductive coating 121 on the stationary cylinder 123. The rotational force 138 that is felt by the charges 135 on the flat smooth conductive coating 121 on the stationary cylinder 123 generates an electric current in the smooth conductive coating 121 in the opposite direction of rotation of the rotating cone 112. The rotational force 136 is felt by the charges 135 on the flat smooth conductive coating 121 on the stationary cylinder 123 that generates an electric current in the smooth conductive coating 121 that is in the same direction of the rotating cones 111.

The amplitude of the rotational forces 136 and 138 observed by the negative charges 135 on the flat smooth conductive coating has the same amplitude as the total axial force on the assembly.

The rotating cones 111 and 112 may be rotated in opposite directions with the stationary cylinder 123 being stationary and the rotational forces 136 and 138 on the charges 135 on the flat smooth conductive coating 121 on the stationary cylinder 123 from the cones then are in the same direction.

Figure 16:
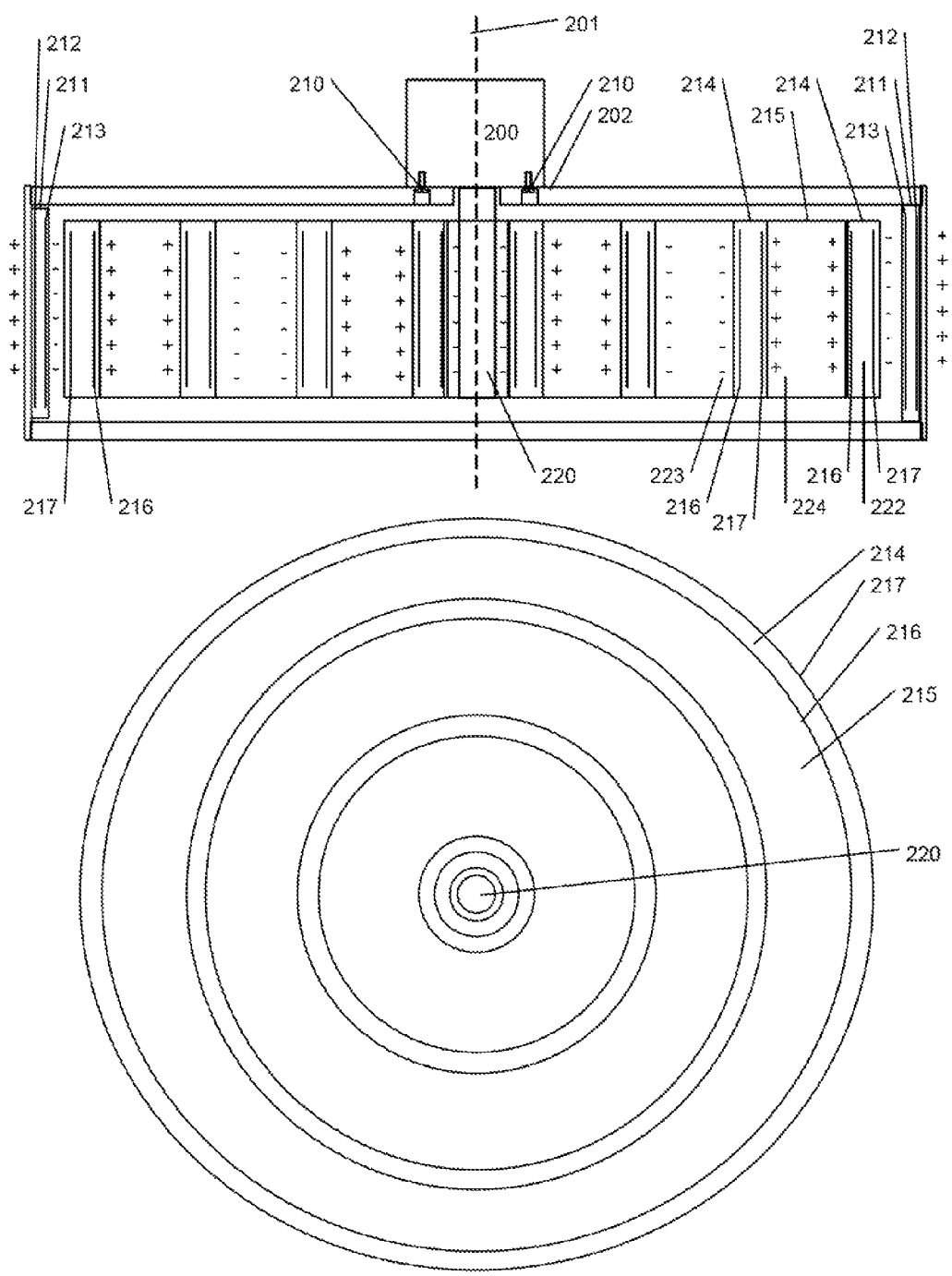
FIG. 16 illustrates embedded capacitors in a rotating disk to counteract centrifugal forces on a rotating disk.

FIG. 16 shows an example using embedded capacitors 214 in a rotating disk 215 to counteract the centrifugal forces that the rotating disk 215 experiences. This example is based on the difference in the relative velocity electric fields for the different capacitor elements as these rotate around the disk at different speeds to generate forces that counteract the centrifugal forces.

This example includes one rotating disk 215, a stationary outer shell 202, and a rotation mechanism 200. The rotation mechanism 200 may be any suitable means, such electronic, mechanical or other method. The rotation mechanism 200 rotates the rotating disk 215 thru the rotating shaft 220 about a rotation axis 201. The rotating disk 215 includes an electrically non-conductive material that has a number of cylindrical capacitors 214 associated with (e.g., embedded in) the disk that circle around the center of the disk at substantially equally spaced intervals out from the center of disk. The cylindrical capacitors 214 extends from the top of the disk to the bottom of the disk and are composed of two plates 216 and 217 and an ultra-high dielectric 222.

FIG. 17 shows the electrical connections and the static electric fields from the cylindrical capacitors 214. The cylindrical capacitors 214 are all electrically connected in parallel and are charged to about the same potential difference. The charges 223 and 224 on the plates 216 and 217 of the cylindrical capacitors 214 alternate between cylindrical capacitors 214, such that like charges face each other for the individual capacitors. The cylindrical capacitors 214 may be charged from an external source, or a source in the disk. Charging may be electronically, mechanically, chemically, through induction, or friction, to name only a few examples. If only one potential source is used to charge all the capacitors then the charges between the individual capacitor elements have to have their inertial frames of references isolated from one another. This accomplished by wiring up the capacitor plates such that the relative velocity electric field gradients resists the redistributing of the negative electric charges when the disk is rotating.

The static electric field generated by the charged cylindrical capacitors 214 is just observed in between the charged plates 216 and 217. The forces 231 that the rotating disk 215 experiences when not rotating are the attractive forces on the cylindrical capacitors 214 on plates 216 and 217 are from the opposite charges 223 and 224 on each of the cylindrical capacitors 214 on plates 216 and 217. The forces in between the cylindrical capacitors 214 from the charged plates 216 and 217 with the same polarities are generally considered to be insignificant. The stationary case 202 cylindrical capacitors 211 on plates 213 and 212 experience the force 230 when the rotating disk 215 is not rotating and the stationary case 202 cylindrical capacitors 211 on plates 213 and 212 are charged.

FIG. 18 shows the relative velocity electric fields 237 and 238 observed by the charges 223 and 224 on the cylindrical Capacitors 214 plates 216 and 217 when the cylindrical capacitors 214 are charged and the rotating disk 215 is rotating. The relative velocity electric fields 237 component used to counteract the centrifugal forces is the one observed from the cross product of the velocity of the electric charges on the cylindrical capacitors 211 plates 213 and 212. Each of these cylindrical capacitors 214 have relative velocity electric fields 237 that increase the farther toward the edge of the disk when the cylindrical capacitors 214 is charged and the rotating disk 215 is rotating. The reason for the increase in the relative velocity electric fields 237 is the individual charges moving at greater speeds the farther toward the edge of the disk as the disk rotates.

The relative velocity electric fields 237 observed from the charges on the cylindrical capacitors 214 plates 216 and 217 when the rotating disk 215 is rotating is canceled out inside each of the cylindrical capacitors 214, but may still be observed on the external sides of the cylindrical capacitors 214. This effectively shield's the relative velocity electric fields 237 observed on the outside face of the plate 216 from the relative velocity electric field from the plate 217 of the opposite polarity. This allows the outside plate 217 to feel an inward force 236 from the relative velocity electric field 237 from the charges on the Inside plate 216 on its neighboring cylindrical capacitor 214.

The outermost or last cylindrical capacitor 214 element on the rotating disk 215 is the capacitor element that has the greatest velocity difference from the cylindrical capacitor 211 attached to the stationary outer shell 202. The outside plate 217 of the last cylindrical capacitor 214 element on the disk has the greatest force 235 from the relative velocity electric fields 238 due the greatest difference in the velocity of the moving charges and stationary disk. This creates an outward force 240 on the enclosure slightly less than the force 235 observed on the outside plate 217 of the last cylindrical capacitor 214 element on the rotating disk 215. The difference in these forces is observed as a drag force on the charges on plate 212. This is observed as a rotating electric current and a drag force if there is a negative charge on plate 212 or as a drag force on plate 212 if it has a positive charge.

The relative velocity electric fields 237 observed from the cross product of the velocity and charge density does not have to be zero inside of the conductor from the non-rotating frame of reference. This gives the relative velocity electric fields 237 and 238 a tent shape as a charged insulator. The tent shape relative velocity electric fields 237 and 238 observed in the direction of motion comes about due to the symmetry of the flat plate.

Figure 19:
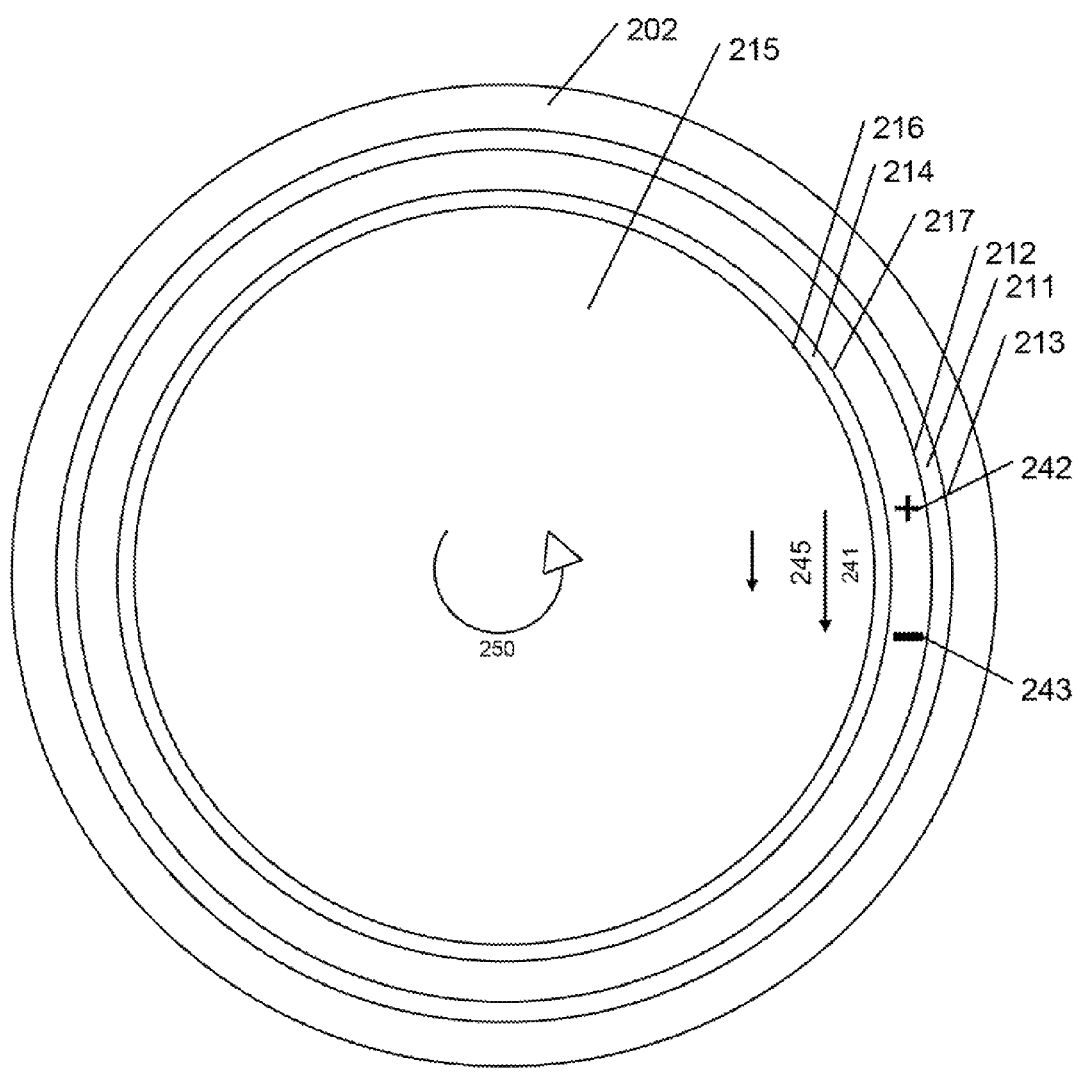
FIG. 19 illustrates a drag force on the embedded capacitors in a rotating disk in FIG. 15.

FIG. 19 depicts the drag force 245 observed on theses capacitor elements that have a negative charge on plates 217 and 212 that resists rotation of the rotating disk 215. This drag force 245 is created from the relative velocity electric field 241 from the scalar electric potentials 242 and 243 that arises from the dot product of the electric charge and velocity. The relative velocity electric fields 241 observed by the outside plate 217 is produced from the relative velocity electric field from the charges on the inside plates 216 and 212. The relative velocity electric field 241 presents a higher potential 242 to the charges approaching each other, and presents an electric field from a lower potential 243 on the charges moving away from each other. This is observed as a relative velocity electric field 241 difference on the outside plates 217 of the cylindrical capacitors 214 when the rotating disk 215 is rotated. The inside plates experience the same scalar electric potentials 242 and 243, but because these are moving at a slower speed, their effect just slightly offsets the scalar electric potentials 242 and 243 on the outer plates of the cylindrical capacitors 214 and 211.

The charges approaching each other on the cylindrical capacitors 214 plates 216 and 217 have an added relative velocity electric field 241 component from the scalar electric potentials 242 and 243 based on the static potential plus the scalar electric potential 242 multiplied by time, as shown by the following equation.

$$\Phi_{Total} = \Phi_{Static} + \left(\vec{\nabla} \cdot \frac{\vec{V}}{c} \Phi_{Static}\right) t \text{ volts}$$

The charges moving away from each other have an added relative velocity electric field 241 component from the scalar electric potential 243, based on the static potential minus the scalar electric potential 243 multiplied by time as shown by the following equation:

$$\Phi_{Total} = \Phi_{Static} - \left(\vec{\nabla} \cdot \frac{\vec{V}}{c} \Phi_{Static}\right) t \text{ volts}$$

The time component in the above equations implies the possibility of buildup of these scalar electric potentials 242 and 243. Normally the increase of scalar electric potential 242 by an approaching charge is offset by the same decrease in scalar electric potential 242 from the same charge moving away from a point in space. But if the charge is being accelerated perpendicular to the direction of motion, then the increase of scalar electric potential 242 by an approaching charge is not offset by the same decrease in scalar electric potential 242 from the same charge moving away from a point in space. This results in a buildup of the negative scalar electric potential 242 on the inside the inside plate 216 on the cylindrical capacitors 214 and a buildup of a positive scalar electric potential 242 on the outside the outside plate 217 on the cylindrical capacitors 214 as the rotating disk 215 rotates. This effect is observed as a buildup over time of a radial electric field that creates a secondary force that also counteracts the centrifugal forces as the rotating disk 215 rotates.

The radial electric field from the scalar electric potentials 242 and 243 that buildup on the inside and outside of the cylindrical capacitors 214 may be used to produce an axial force along the axis of rotation by using non-rotating horizontal charged rings positioned between the cylindrical capacitors on the insides of the enclosure 202.

Figure 20:
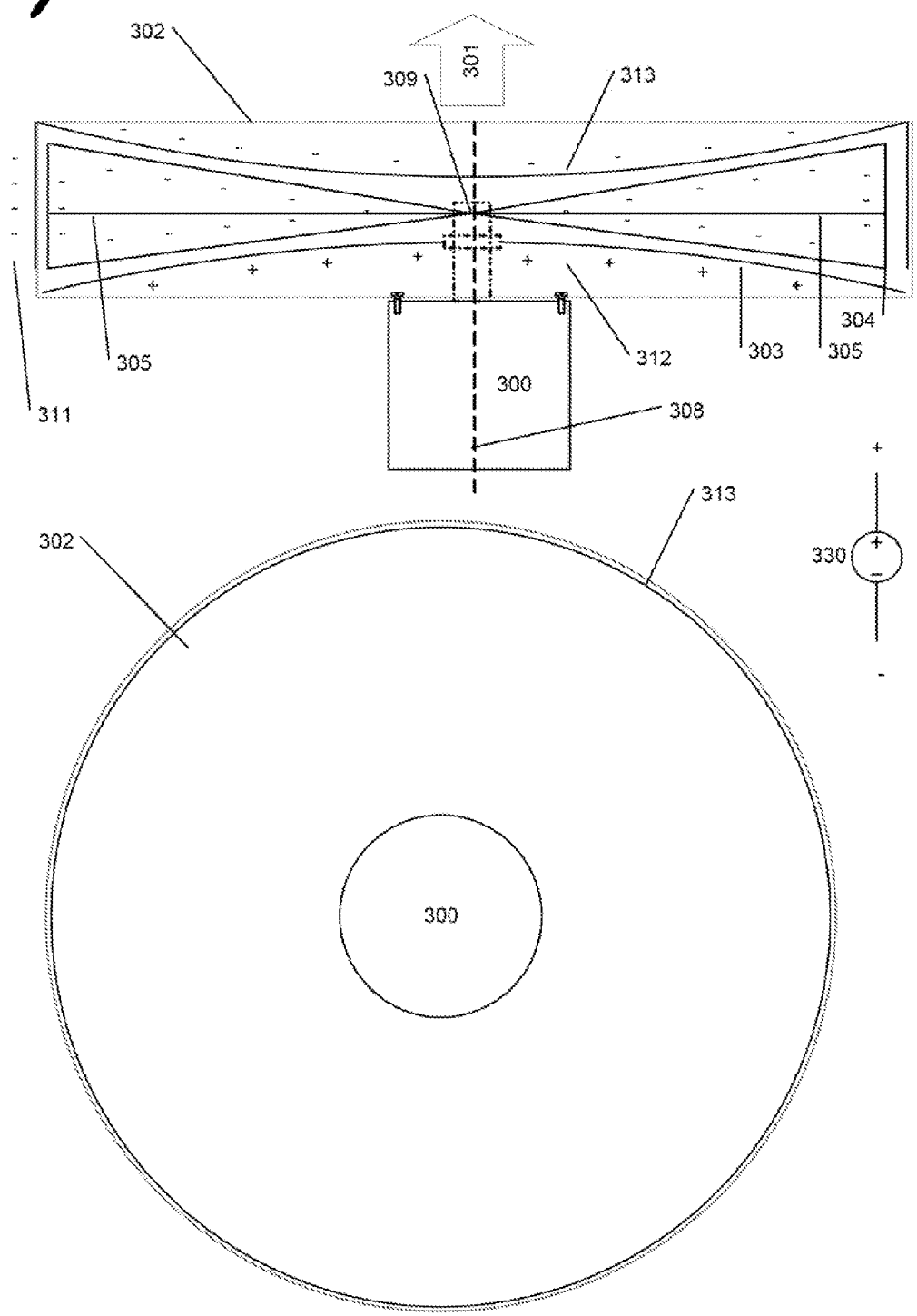
FIG. 20 illustrates using the difference in relative velocity electric fields from a curved surface and a smooth flat surface to generate an axial force having a reaction force that resists rotation of a rotating dual conical disk.

FIG. 20 is an example using the difference in the relative velocity electric fields from a curved surface and a smooth flat surface to generate an axial force 301 that has a reaction force that resists the rotation of a rotating dual conical disk 305. This example also uses relative velocity electric fields to counteract the centrifugal forces that the rotating dual conical disk 305 experiences.

The example device has a rotating dual conical disk 305, a stationary outer shell 302, a curved charged surface 313 and 303, voltage source 330 and a rotation mechanism 300. The rotation mechanism 300 may be any suitable means (e.g., electronic, mechanical or any other method). The rotation mechanism 300 rotates the dual conical disk 305 through the rotating shaft 309 about a rotation axis 308. In an example, the rotating mechanism is a motor (e.g., electric, thermodynamic, molecular, pneumatic, hydraulic or synthetic) or a combination thereof, or any other means.

In an example, the rotation mechanism 300 is an electric motor. The rotation mechanism 300 rotates the dual conical disk 305 at speeds that increase or optimize the acceleration generated fields to produce an axial force on the fixed disks 303, 313.

The rotation mechanism 300 rotates the dual conical disk 305 at speed(s) for generating the complex electric fields from the acceleration of the rotating charges, while remaining below the mechanical breakdown speed of the rotating disk. In an example, the rotation mechanism 300 rotates the dual conical disk 305 at speeds higher than 1,000 rpm (rotations per minute), for example 3600-7200 rpm or greater.

The dual conical disk 305 is an axially symmetrical dual conical disk that has opposing conical upper and lower surfaces whose thickness increase when moving away from the center of the disk. The dual conical disk 305 is composed of an electrically non-conductive material coated on the top, bottom, and the outside surface with a conductive coating 304. The electrically non-conductive material of the disk may be replaced by a hollow box formed by the conductive surfaces. The top and bottom conductive surfaces are used to present a relative velocity electric field to the curved charged surface that generates the axial force 301. The outside surface at the edge of the disk is used to present a relative velocity electric field to the conductive surface on the outer shell to counteract the centrifugal forces on the dual conical disk 305 when rotated.

The conductive surfaces 304 on the dual conical disk 305 are smooth, flat surfaces charged with a high negative potential. The conductive surfaces 304 may be smooth and flat to increase or maximize the effects of the cross product of the velocity and the charge on the disk and to minimize the effects of the dot product of the velocity and the charge on the disk.

The conductive surfaces 304 on the dual conical disk 305 are charged to a high electric potential from any DC voltage source. The curved charged surfaces 313 and 303 are conductive surfaces charged to opposite polarities by any DC voltage source. These curved charged surfaces 313 and 303 are curved to minimize the amplification of the relative velocity electric field that occurs at the center of a flat charged surface from the cross product of the velocity and the charge. The curved charged surfaces 313 and 303 should be curved sufficient to maintain the non-perpendicular electric field components of the charges on the surface from lining up across the surface. The curved charged surfaces 313 and 303 may be a thick, high-resistance conductive surface with charged macroscopic, microscopic, or nanoscopic conductive particles (e.g., a high-resistance coating) to maximize the drag force from the dot product of the velocity and the charge on the rotating dual conical disk 305.

The curved charged surfaces 313 and 303 are charged to opposite potentials from the voltage source 330 so that they respond differently to the relative velocity electric fields from the conductive surfaces 304 on the dual conical disk 305.

The voltage source 330 may charge the conductive surfaces 304 and the curved charged surfaces 313 and 303. The voltage source 330 may be one source that can put an isolated charge onto all of the conductive surfaces or may be multiple sources to charge each conductive surface. The voltage source 330 preferably produces a DC voltage across the curved charged surfaces 313 and 303 and the conductive surfaces 304. In an example, the voltage source 330 supplies about 1,000 to 100,000 Volts (e.g., greater than 1,000 Volts or about 1,000 to 10,000 Volts).

Figure 21:
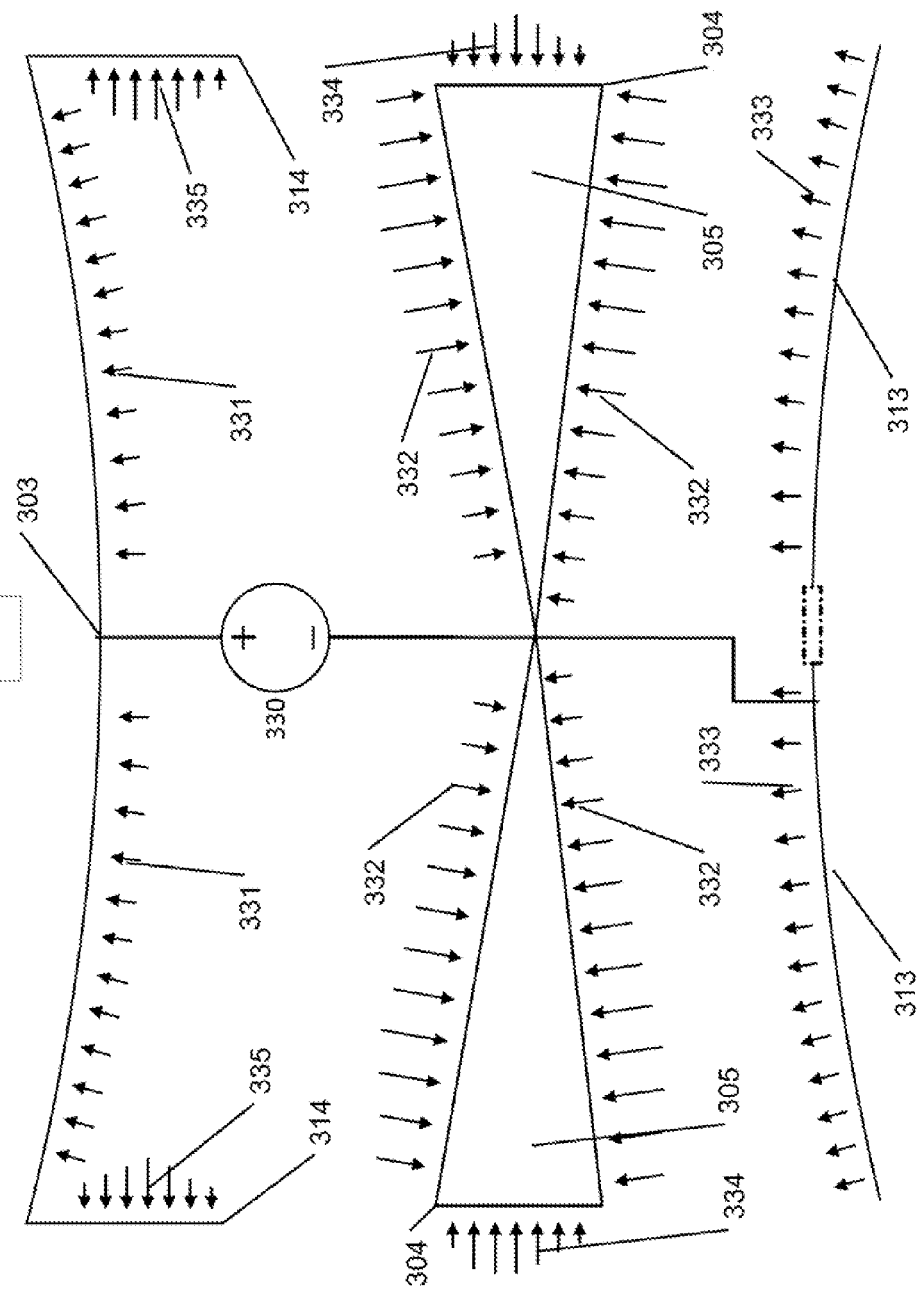
FIG. 21 illustrates relative velocity electric fields when the conductive surfaces and the curved charged surfaces in FIG. 20 are charged and the dual conical disk is rotating.

FIG. 21 shows the relative velocity electric fields 331, 332, 333, and 334 when the conductive surfaces 304 and the curved charged surfaces 313 and 303 are charged and the dual conical disk 305 is rotating. This figure includes the electrical schematic showing the voltage source 330 and its electrical connections. The curved charged surface 303 is charged to a high positive potential and the curved charged surface 313 and conductive surfaces 304 are charged to a high negative potential.

When the conductive surfaces 304 are electrically charged, these have a static electric field perpendicular to the face of the charged surfaces with the electric field inside the conductive coating at or about zero.

The relative velocity electric field 332 created from the added static electric potential is produced from the cross product of the velocity and charge density. The relative velocity electric field 332 does not have to be at or near zero inside of the conductor from the non-rotating frame of reference. This new electric field from this moving static electric potential is different from the flat conductive surface and the curved surface. This new electric field from the conductive surfaces 304 is due to the motion of the charges on the dual conical disk 305. These charges are going to be moving at different speeds depending at least in part on the location on the dual conical disk 305.

The relative velocity electric fields 332 observed from the non-rotating frame of reference on the top and bottom conductive surfaces 304 have a tent shape like such as that observed on a charged insulator. The relative velocity electric fields 332 observed from the curved charged surfaces 313 and 303 inertial frames of reference from this added static electric potential are produced from the cross product of the relative velocity difference and the electric charge.

The relative velocity electric fields 334 observed from the non-rotating frame of reference on the vertical conductive surfaces 304 has a tent shape like one observed on a charged insulator. The relative velocity electric fields 335 observed from the rotating frame of reference on the vertical conductive surfaces 304 also has a tent shape like the one that is observed on a charged insulator. These relative velocity electric fields 334 and 335 now produce an inward force on the rotating dual conical disk 305 and an equal outward force on the conductive surfaces 304. This then effectively transfers the centrifugal force of the rotating dual conical disk 305 to the outer shell 302.

The relative velocity electric fields 331 and 333 from the charged curved charged surfaces 313 and 303 does not need to have the same shape as that from the flat conductive surfaces 304. The individual charges on curved charged surfaces 313 and 303 does not have the non-perpendicular electric field components lining up with the other charges on the curved charged surfaces 313 and 303 such as that of the flat conductive surfaces 304. This gives relative velocity electric fields 331 and 333 flat similar to the static electric fields from the curved charged surfaces 313 and 303 without amplification of the electric fields at the center of the flat conductor when viewed from its direction of motion. This difference in relative velocity electric fields 331, 332, 333, and 334 observed by the static charges gives rise to the axial force 301.

Figure 22:
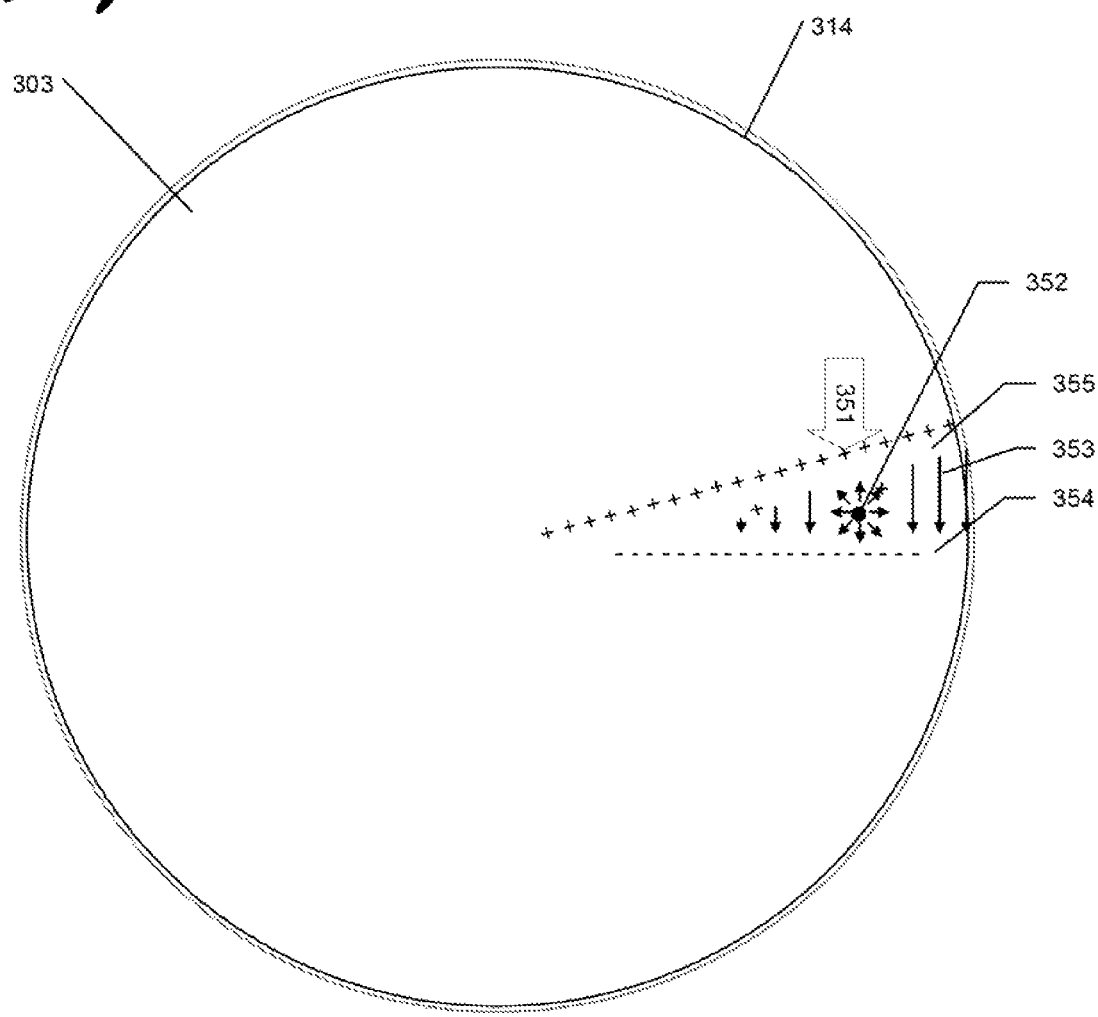
FIG. 22 illustrates relative velocity electric potentials and relative velocity electric fields in FIG. 20.

FIG. 22 depicts the relative velocity electric potentials 355 and 354 and relative velocity electric field 353. When the conductive surfaces 304 and the curved charged surfaces 313 and 303 in FIG. 21 are electrically charged and the dual conical disk 305 is rotating the charges 352 on the flat conductive surfaces 304 now experience an electric field 353 from the relative velocity electric potentials 355 and 354. The electric field 353 from the relative velocity electric potentials 355 and 354 arise from the dot product of the potential and the relative velocity difference of the electric charges from the rotating dual conical disk 305 and the stationary curved charged surfaces 313 and 303. The relative velocity electric potentials 355 and 354 presents a greater electric potential to the charges approaching each other and presents lesser electric potential to the charges receding from each other. This is observed as an electric field difference observed from the rotating dual conical disks 305 view point of view from the curved charged surfaces 313 and 303.

The charges approaching each other now have an added electric field component from the scalar electric potential is based on the static potential plus the electric scalar potential multiplied by time as shown by the following equation:

$$\Phi_{Total} = \Phi_{Static} + \left(\vec{\nabla} \cdot \frac{\vec{V}}{c} \Phi_{Static}\right) t \text{ volts}$$

The charges moving away from each other now have an added electric field component from the scalar electric potential based on the static potential minus the electric scalar potential multiplied by time as shown by the following equation:

$$\Phi_{Total} = \Phi_{Static} - \left(\vec{\nabla} \cdot \frac{\vec{V}}{c} \Phi_{Static}\right) t \text{ volts}$$

The units of the relative velocity electric potentials 355 and 354 have a time component that allows these scalar potentials to build over time. This results in the force that resists the rotation 351 of the dual conical Disk 305 increasing as the dual conical disk 305 rotates. This also results in the creation of a radial relative velocity electric field along the curved charged surfaces 313 and 303 that adds to the static electric fields from the curved charged surfaces 313 and 303 to increase the axial force 301 over time as the dual conical disk 305 rotates.

Before continuing, it should be noted that the examples described above are provided for purposes of illustration, and are not intended to be limiting. Other devices and/or device configurations may be utilized to carry out the operations described herein. Although simple shapes and objects were used to illustrate the principles of forces described herein, any shape and/or size object may implement the teachings herein to effect motion. By way of example, the principles of motion described above may be utilized by spacecraft, satellites, and other objects to effect motion based on the forces generated using the techniques described herein.

It is noted that the examples shown and described are provided for purposes of illustration and are not intended to be limiting. Still other examples are also contemplated.

The invention claimed is:

1. A method comprising:
    providing a first electrically isolated charged object and a second electrically isolated charged object, the first object having a static electric field and the second object having a separate static electric field;
    moving at least one of the first object and the second object relative to one another; and
    producing an action force having a reaction force perpendicular to the action force, the reaction force formed by differences in interactions of the static electric field of the first object and change in the static electric field of the first object from the relative motion of the second object and interactions of the static electric field of the second object and change in the static electric field of the second object from the relative motion of the first object.

2. The method of claim 1, wherein the change in the static electric fields of the first object and the second object is defined by a cross product of relative velocity and charge of the first object and the second object.

3. The method of claim 1, wherein the change in the static electric fields of the first object and the second object is defined by a dot product of relative velocity and charge of the first object and the second object.

4. The method of claim 1, wherein the change in the static electric fields of the first object and the second object is defined by a potential of a dot product of relative velocity and charge of the first object and the second object.

5. The method of claim 1, wherein the interacting is defined by acceleration generated electric fields of an accelerated charged object.

6. The method of claim 1, further comprising amplification of the change in the static electric field of the first and second objects in relative motion.

7. The method of claim 6, wherein the amplification of the change in the static electric field of the first and second objects in relative motion is perpendicular to the direction of relative motion over a flat moving object.

8. The method of claim 6, wherein the amplification of the change in the static electric field of the first and second objects in relative motion is in a direction of relative motion over a flat moving charged object.

9. The method of claim 6, wherein non-amplification of the change in the static electric field of the first and second objects in relative motion is over a curved moving charged object.

10. The method of claim 1, wherein the change in the static electric field of the first and second objects in relative motion is produced from electric potentials that are decoupled from the first and second charged objects.

11. A system comprising:
    a first electrically isolated charge-holding object, and a second electrically isolated charge-holding object, at least one of the first object and the second object in relative motion with respect to the other object;
    means for producing an action force having a reaction force perpendicular to the action force, the reaction force caused by differences in interaction of changes to a static electric field of the second object from a static electric field of the first object compared to interaction of changes to a static electric field of the first object from the static electric field of the second object; and
    wherein the charge-holding objects are electrically conductive objects electrically isolated from one another, electrically isolated from electric potential sources in different inertial frames of references, and electrically isolated from other conductive objects in different inertial frames of references as the first and second objects.

12. The system of claim 11 wherein the charge-holding objects include a dielectric.

13. The system of claim 11 wherein the charge-holding objects are within a non-conductive assembly.

14. The system of claim 11 wherein the charge-holding objects move at different velocities.

15. The system of claim 11 wherein the charge-holding objects are accelerated.

* * * * *